(12) United States Patent
Babu Balasubramani et al.

(10) Patent No.: US 11,252,052 B1
(45) Date of Patent: Feb. 15, 2022

(54) INTELLIGENT NODE FAILURE PREDICTION AND TICKET TRIAGE SOLUTION

(71) Applicant: Accenture Global Solutions Limited, Dublin (IE)

(72) Inventors: Shoban Babu Balasubramani, Bangalore (IN); Meet Navinchandra Jivani, Baroda (IN); Ruchi Chaudhary, Gurgaon (IN); Kaushik Sanyal, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/180,706

(22) Filed: Feb. 19, 2021

(30) Foreign Application Priority Data

Nov. 13, 2020 (IN) .............................. 202041049721

(51) Int. Cl.
  *H04L 12/24* (2006.01)
  *H04L 12/26* (2006.01)
  *G06N 20/00* (2019.01)

(52) U.S. Cl.
  CPC ......... *H04L 41/5074* (2013.01); *G06N 20/00* (2019.01); *H04L 41/0645* (2013.01);
  (Continued)

(58) Field of Classification Search
  CPC . H04L 41/5074; H04L 41/16; H04L 41/0645; H04L 43/0817; H04L 43/02; H04L 43/04; G06N 20/00
  See application file for complete search history.

(56) References Cited

U.S. PATENT DOCUMENTS 6,353,902 B1 * 3/2002 Kulatunge .............. H04L 41/06 714/47.3
10,270,644 B1 * 4/2019 Valsecchi ............ H04L 41/0654
(Continued)

OTHER PUBLICATIONS

Sipos, R. et al., "Log-based Predictive Maintenance," Proceedings of the 20th ACM SIGKDD International Conference on Knowledge Discovery and Data Mining, Aug. 2014, pp. 1867-1876, https://doi.org/10.1145/2623330.2623340.
(Continued)

*Primary Examiner* — Philip C Lee
(74) *Attorney, Agent, or Firm* — Norton Rose Fulbright US LLP

(57) ABSTRACT

Embodiments provide for prediction and mitigation of network faults. Information associated network nodes may be compiled and used to generate network analytical records (NARs). A first model may be executed against the NARs to predict faults associated with one or more nodes of the network. Tickets are generated for predicted faults and stored in a ticket database. The tickets may be analyzed to predict executable actions to mitigate the faults associated with each ticket. To analyze the tickets, ticket data may be compiled and used to generate ticket analytical records (TARs). A second model may be executed against the TARs predict actions to resolve the predicted faults. The predicted actions may be executed to mitigate the impact that the faults have on the network, which may include preventing the faults entirely (e.g., via preventative maintenance) or minimizing the impact of the faults via use of the predicted actions.

20 Claims, 12 Drawing Sheets

(52) U.S. Cl.
CPC .............. *H04L 41/16* (2013.01); *H04L 43/02* (2013.01); *H04L 43/04* (2013.01); *H04L 43/0817* (2013.01)

(56) References Cited

U.S. PATENT DOCUMENTS

| | | | |
|---|---|---|---|
| 10,693,740 B2* | 6/2020 | Coccia | H04L 43/08 |
| 10,860,451 B1* | 12/2020 | Murthy | G06F 11/079 |
| 2015/0378807 A1 | 12/2015 | Ball et al. | |
| 2018/0373578 A1* | 12/2018 | Bridges | G06F 11/004 |
| 2019/0132191 A1* | 5/2019 | Mann | G06N 5/046 |
| 2020/0372372 A1* | 11/2020 | Jasionowski | G06F 16/2465 |
| 2021/0073819 A1* | 3/2021 | Hernandez | G06F 16/9035 |

OTHER PUBLICATIONS

Nemeth, T., et al., "PriMa-X: A reference model for realizing prescriptive maintenance and assessing its maturity enhanced by machine learning," 51st CIRP Conference on Manufacturing Systems, Procedia CIRP 72, 2018, pp. 1039-1044, ScienceDirect.

\* cited by examiner

INTELLIGENT NODE FAILURE PREDICTION AND TICKET TRIAGE SOLUTION

CROSS-REFERENCE TO RELATED APPLICATION

The present application claims priority from Indian Provisional application No. 202041049721 filed Nov. 13, 2020 and entitled "INTELLIGENT NODE FAILURE PREDICTION AND TICKET TRIAGE SOLUTION," the disclosure of which is incorporated herein by reference in its entirety.

TECHNICAL FIELD

The present invention relates generally to network monitoring systems and more specifically to artificial intelligence based network monitoring systems for predicting and mitigating the occurrence of faults and failures with respect to nodes and devices of a network.

BACKGROUND OF THE INVENTION

With the advent of 3G/4G/5G technologies coupled with high speed fiber and cable broadband, connectivity and network uptime have become the most important factor in network operations. Additionally, round the clock connected devices, software, and services created and hosted on the cloud and made accessible through Internet, put forward a unique challenge to the industry in terms of uninterrupted connectivity. Telecommunication services are getting concentrated around a single source of medium for information transfer, which is data. For mobile communication, voice and other value added services, which were earlier created around general packet radio service (GPRS) and related services are now merged to data as a medium. Similarly, traditional video and allied services are also merged to data as transfer medium. This represents a change for telecommunication services, but other modes of transfer and communication, such as through wired and fiber cables, have always used data as a transfer medium.

On account of the merger of a multitude of services over data as means of transfer, the telecommunication backhaul infrastructure is being revamped, such that a single network provides the data backbone, while last-mile distribution of data happens through respective channels, such wireless through mobile 3G/4G/5G nodes, distribution POP (Point of Presence) units for fiber based communication, etc. This aggregation of multiple layers on a single network poses a unique problem for services and operations in terms of repair and servicing of network nodes or assets, challenges related to downtime, network traffic management, and maintenance of priority connections. Integration of different communications technologies also increases the complexity required to manage service continuity.

Due to above mentioned complexities, current service and repair identification and actions are primarily performed in a manual and reactive manner. For example, service/repair actions are performed after a network element failure event, rather than in a manner that prevents the failure in the first place or in a predictive manner that enables the repair to be completed more quickly. Secondly, due to non-availability of a unified view of network element alarms, disconnections, and ticket events, the repair action by a service engineer is unguided and limited to personal experience.

BRIEF SUMMARY OF THE INVENTION

The present invention is directed to systems, methods, and computer-readable storage media for predicting faults (e.g., failures, disconnections, etc.) in nodes of a network. When a fault occurs, information associated with the fault may be detected and recorded by a monitoring system. The monitoring system may also monitor the status of the network nodes and devices, such as to record temperatures, CPU usage rates, memory utilization, and the like. Information associated with the status of the nodes and the detected faults may be provided to a fault mitigation device that may use the information to generate network analytical records (NARs). The NARs may include a set of metrics (e.g., KPIs, etc.) associated with the nodes of the monitored network and information associated with various types of faults. The NARs may be evaluated against a first model that is configured to predict faults (e.g., failure events) and identify one or more of the nodes of the network expected to experience the predicted failure events in the future. The fault mitigation device may generate tickets associated with the predicted faults and store the tickets at a database (e.g., a local database or a database of a ticket management system).

The fault mitigation device may also be configured to analyze historical tickets to derive information that may be used to create a dictionary that may be used to predict actions to mitigate or resolve predicted faults. The analysis of the historical tickets may include generating tokens based on the ticket data, determining a frequency of the tokens, and identifying verb-noun dependencies within the tickets. The tokens, token frequency, and verb-noun dependency information may be used to construct the dictionary, which may include information that may then be used to extract actions from historical tickets. For example, using the information recorded in the dictionary, fuzzy logic may be used to extract actions from historical tickets and tag the historical tickets based on the characteristics of the extracted actions. The ability to extract action data from the historical tickets and tag the historical tickets may enable a model to be trained to analyze tickets (e.g., live or open tickets associated with predicted failure events).

Fault mitigation devices of embodiments may also be configured to generate ticket analytical records (TARs) based on various types of ticket data. The TARs may be evaluated against a second model configured to identify self-healable tickets (i.e., tickets that are associated with failure events that will be automatically resolved without further action) and non-self-healable tickets. The second model may also be configured to further analyze the non-self-healable tickets to predict actions for resolving the failure events associated with those tickets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

Figure 1:
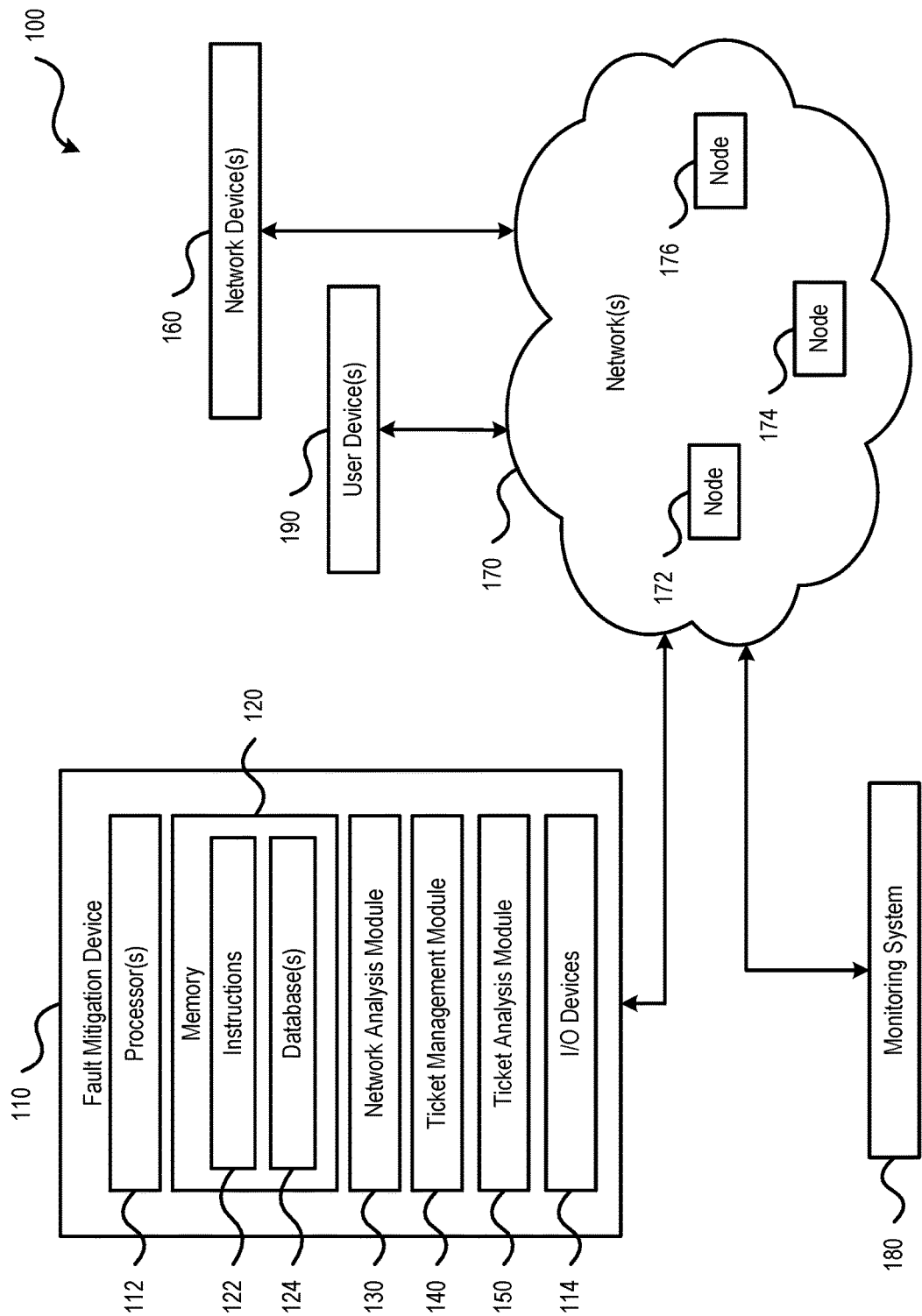
FIG. 1 shows a block diagram of a system for predicting and mitigating faults of nodes of a network in accordance with embodiments of the present disclosure according to embodiments of the present invention.

Referring to FIG. 1, a block diagram of a system for predicting and mitigating faults of nodes of a network in accordance with embodiments of the present disclosure is shown as a system 100. As shown in FIG. 1, the system 100 includes a fault mitigation device 110 that is communicatively coupled to a fault monitoring system 180 via one or more networks 170. The fault mitigation device 110 includes one or more processors 112, one or more input/output (I/O) devices 114, a memory 120, a network analysis module 130, a ticket management module 140, and a ticket analysis module 150. The memory 120 may store instructions 122 that, when executed by the one or more processors 112, cause the one or more processors 112 to perform operations for predicting and mitigating faults on a plurality of network nodes (e.g., Digital Subscriber Line Access Multiplexers (DLSAMs), switches, routers, relays or repeaters, evolved nodeBs (eNBs), next generation NBs (gNBs), servers, etc.), such as 172, 174, 176, and network devices 160 (e.g., IoT devices, etc.). The memory 120 may also store instructions in one or more database 124. Exemplary aspects and operations of the fault mitigation device 110 are described in more detail below.

The monitoring system 180 may be configured to compile information associated with alarms, connectivity, and performance data associated with the network nodes and network devices. A portion of the compiled information may be generated by the monitoring system 180 based on monitoring of the nodes of the network(s) 170. For example, the monitoring system 180 may periodically generate and transmit messages (e.g., ping messages, alive messages, or status inquiry messages) to nodes 172, 174, 176 of the network 170 to verify a state of the nodes. If the nodes 172, 174, 176 respond to the messages, the monitoring system 180 may record information at a database (i.e., a database stored at a memory of the monitoring system 180, an external database accessible to the monitoring system 180, such as the one or more databases 124, or both). If one or more of the nodes 172, 174, 176 does not respond to the message, the monitoring system 180 may determine that a network fault has occurred with respect to that node(s) and may record information associated with the event at the database. Additionally, portions of the compiled information may be generated by the nodes of the network. For example, nodes of the network may periodically transmit information associated with alarms, connectivity, or network node performance to the monitoring system 180. The transmission of information from the nodes to the monitoring system 180 may be based on the occurrence of an event (e.g., a failure event, detection of a problem or condition associated with the node, detection of a problem or condition associated with another node, and the like). The nodes may also transmit information to the monitoring system 180 based on a time interval (e.g., once per hour, every 3 hours, every 6 hours, every 12 hours, every 24 hours, or another period of time). For example, at the end of the time interval, the node may transmit a snapshot of its current operating state (e.g., temperature, memory utilization, throughput, packet loss, memory utilization, etc.) to the monitoring system 180. It is noted that the exemplary operations for monitoring the nodes and obtaining the compiled information by the monitoring system 180 have been described for purposes of illustration, rather than by way of limitation and that the monitoring system 180 may utilize additional techniques to compile information that may be used to predict network faults and failures in accordance with the concepts disclosed herein.

The alarm data may include failure alarms, state alarms, or other types of alarms generated by the nodes of the network. Failure alarms may be generated in response to failure of a node (e.g., a node is not available, etc.) or a component of a node (e.g., a port failure, processor failure, memory failure, etc.). State alarms may be generated based on one or more threshold parameters associated with a state of the node(s) of the network, such as a temperature threshold being exceeded, CPU over-utilization threshold being exceeded, or a packet loss threshold being exceeded, and the like. In some aspects, alarms may include an alarm identifier (ID), an node ID (e.g., information identifying the network node associated with the alarm), domain information (e.g., information indicating a domain of the network in which the network node is operating), a timestamp indicating a time when the condition triggering the alarm was detected, or other types of information that provide context to the alarm, the source of the alarm, and the cause of the alarm. It is noted that the exemplary types of information included in the alarms has been described for purposes of illustration, rather than by way of limitation and that embodiments of the present disclosure may be utilized with alarms containing information other than or in addition to the specific examples described herein.

In some aspects, the alarm ID may indicate a type of alarm, such as a failure alarm or a state alarm. For example, a first alarm ID may indicate a failure alarm associated with a port of the node of the network and a second alarm ID may indicate a troubled state of the node. It is noted that there may be multiple alarm IDs for a single type of alarm. For example, different alarm IDs may be associated with different types of failures or states of the nodes. Moreover, different types of network nodes may transmit different sets of available alarms and corresponding alarm IDs. For example, a network relay node may have a different set of available alarms than a Digital Subscriber Line Access Management (DSLAM) node due to different types of operations and hardware utilized by different types of network nodes. However, it is noted that there may be some commonality among the sets of available alarms for different types of network nodes. For example, different types of network nodes may each have an alarm associated with a particular state (e.g., memory utilization, packet loss, etc.) or particular type of failure. Additionally, it is noted that threshold associated with triggering state alarms may be different for different types of network nodes (e.g., a first type of network node may trigger a state alarm indicating high memory utilization when memory utilization exceeds 90% of available memory while a second type of network node may trigger a state alarm indicating a high memory utilization when memory utilization exceeds 95%).

The connectivity data may include information associated with connectivity of the nodes of the network. For example, the connectivity data may include information associated with network node availability or uptime, disconnection of nodes of the network, connection of nodes (e.g., new nodes) to the network, reconnection of nodes (e.g., existing nodes that have gone offline) to the network, and the like. It is noted that connectivity data may be reported by a node of the network that is experiencing a problem or by another device monitoring the network. For example, a node may detect that it has been disconnected from a portion of the network and transmit information associated with the disconnection to the monitoring system 180, or the monitoring system 180 may detect that a node is not available on the network and may log the event (e.g., store connectivity data indicating the disconnection of the node from the network).

The performance data associated with the network nodes and network devices compiled by the monitoring system 180 may include temperature data. For example, the temperature data may include a temperature of a processor or other components of a network node, a temperature of a room in which the network node(s) is located (e.g., to monitor whether the network node(s) is being properly cooled), and the like. The performance data may also include throughput data, such as information indicating an amount of data (e.g., megabits, megabytes, etc.) transmitted and received by the network node(s). The performance data may also include memory utilization data, such as data indicating buffer levels (e.g., an amount of data stored in a transmit buffer awaiting transmission by the network node and/or a receive buffer awaiting processing by the network node(s), etc.), or other metrics associated with memory of the network node(s). The performance data may also include information associated with a bandwidth of the network(s) being monitored, which may indicate the maximum data transmission rate for the network, a current bandwidth utilization of the network(s) (i.e., how much of a theoretical bandwidth of the network(s) is being used at a particular point in time), or other metrics associated with the bandwidth of the network(s) (e.g., average bandwidth utilization, peak bandwidth utilization, minimum bandwidth utilization, and the like). The performance data may also include latency metrics for the node(s) of the network. The performance data may also include packet metrics (e.g., packet loss metrics, packet sizes, and the like).

The information compiled by the monitoring system 180 may be transmitted to the fault mitigation device 110. Once received, the fault mitigation device 110 the compiled data may be stored at the one or more databases 124. For example, the one or more databases 124 may include a historical network information database in which the compiled information may be stored. The historical network information database may provide visibility into the performance and state of the one or more networks 170 and the nodes 172, 174, 176 over time. The fault mitigation device 110 is configured to utilize the compiled information to predict and mitigate failures, faults, and other types of negative performance issues (i.e., network traffic congestion, etc.) associated with the one or more networks 170 and the nodes 172, 174, 176. As described in more detail below, the fault mitigation device 110 includes a network analysis module 130, a ticket management module 140, and a ticket analysis module 150.

The network analysis module 130, the ticket management module 140, and the ticket analysis module 150 may be configured to provide various functionality to the mitigation device 110 for predicting and mitigating network failures. For example, the network analysis module 130 may be configured to analyze the compiled information to generate a set of metrics (e.g., network analytical records (NARs)). In an aspect, generating the metrics may include creating a first set of metrics and creating a second set of metrics. The first set of metrics may include backward rolling metrics generated based on at least a portion of the compiled information stored at the historical network information database and the second set of metrics may include forward rolling metrics generated based on at least a portion of the compiled information stored at the historical network information database. The metrics may be used to train a model to predict faults or failures of the network, as described in more detail below with reference to FIGS. 2 and 4-6. It is noted that the network analysis module 130 may also be configured to generate the metrics based on live data to predict faults or failures of nodes on the network once training of the model is complete. In an aspect, the portion of the historical network information database used to generate the first set of metrics (i.e., the backward rolling metrics) may be the same as or different from the portion of the historical network information database used to generate the second set of metrics (i.e., the forward rolling metrics). The metrics generated by the network analysis module 130 may be provided as inputs to network performance and predict failure events associated with the network nodes of the one or more networks 170. The network analysis module 130 may also be configured to generate one or more tickets based on predicted faults within the one or more networks 170.

Figure 2:
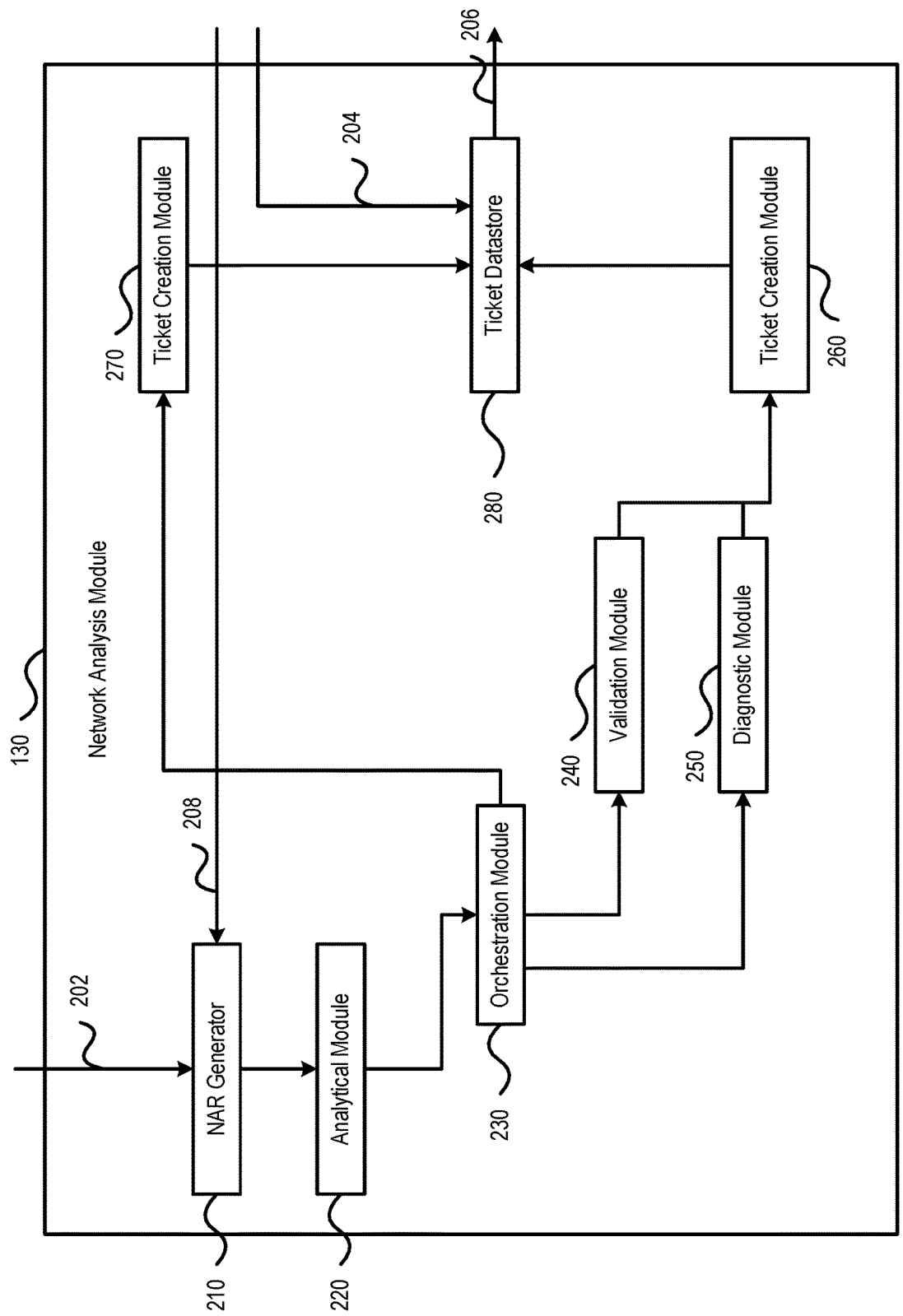
FIG. 2 shows a block diagram illustrating exemplary aspects of a network analysis module in accordance with the present disclosure.

Referring to FIG. 2, a block diagram illustrating exemplary aspects of a network analysis module in accordance with the present disclosure is shown. As shown in FIG. 2, the network analysis module 130 may include a network analytical record (NAR) generator 210, an analytical module 220, an orchestration module 230, a validation module 240, a diagnostic module 250, ticket creation modules 260, 270, and a ticket datastore 280. The NAR generator 210 may be configured to generate the above-described metrics, such as the backward rolling metrics and the forward rolling metrics. The metrics, which may include KPIs and information derived from other types of information (e.g., ticket data, alarm data, disconnection data, etc.) may be received from one or more external sources, as shown at arrow 202. The analytical module 220 may be configured to tune a modelling process that may be executed against the NARs produced by the NAR generator 210 to predict network failures. The predicted network failures may be provided to the orchestration module 230 for analysis. The analysis performed by the orchestration module 230 may include determining a confidence level associated with the predictions.

Based on the confidence levels determined by the orchestration module 230, the predicted failures may be provided to the validation module 240, the diagnostic module 250, or the ticket creation module 270. The validation module 240 and the diagnostic module 250 may be configured to evaluate predicted failures, such as to validate the presence of a failure, performing diagnostics on a node or other validation operations. For example, the validation module 240 may be configured to perform diagnostics on the network nodes (e.g., the nodes 172, 174, 176 of FIG. 1) to evaluate the presence of potential failure conditions and the validation module 250 may be configured to present information associated with a predicted failure to a user (e.g., a network technician or information technology (IT) personnel operating one of the user device(s) 190 of FIG. 1). Once validation and/or diagnostic analysis is complete, information associated with the predicted failures provided to the validation modules 240, 250 may be provided to the ticket creation module 260. It is noted that the failure predictions may be provided to the ticket creation module 270, the validation module 240, or the diagnostic module 250 based on the confidence levels determined by the orchestration module 230. For example, the orchestration module 230 may provide failure predictions associated with confidence levels satisfying a first threshold (e.g., a threshold indicating a high confidence level) to the ticket creation module 270. Failure predictions that are associated with confidence levels that are lower than the first threshold but higher than a second threshold (e.g., a threshold indicating a low confidence level) may be provided to validation module 240 for human validation, and failure predictions associated with confidence levels that are lower than the second threshold may be provided to the diagnostic module 250 for a diagnostic analysis.

The ticket creation modules 260, 270 may be configured to generate tickets associated with predicted network node failures. The ticket creation modules 260, 270 may store the tickets within a database (e.g., the ticket datastore 280) and may also transmit the tickets to a ticket management system (e.g., the ticket management module 140 of FIG. 1). Exemplary aspects of analyzing and processing tickets generated in accordance with aspects of the present disclosure are described in more detail below.

The generated metrics may be configured to correlate key performance indicators (KPIs), which may be derived from information observed during monitoring of a network (e.g., the information compiled by the monitoring system 180 and stored in the historical network information database), with failure events over one or more time periods. For example, historical KPI information and historical network events (e.g., failures, alarms, and the like) may be analyzed to identify patterns with respect to the network events and the observed KPIs. The patterns may be determined on a network element (e.g., type of network node) and network node basis. For example, it may be determined that a first type of network node (e.g., a DLSAM) exhibits KPIs over a period of time (e.g., 1 day, 7 days, 14 days, 30 days, etc.) leading up to a particular network failure event (e.g., a disconnection, an alarm condition, a hardware failure, etc.) while a second type of network node (e.g., a gNB) exhibits different KPIs over a period of time leading up to the particular network failure event.

Figure 4:
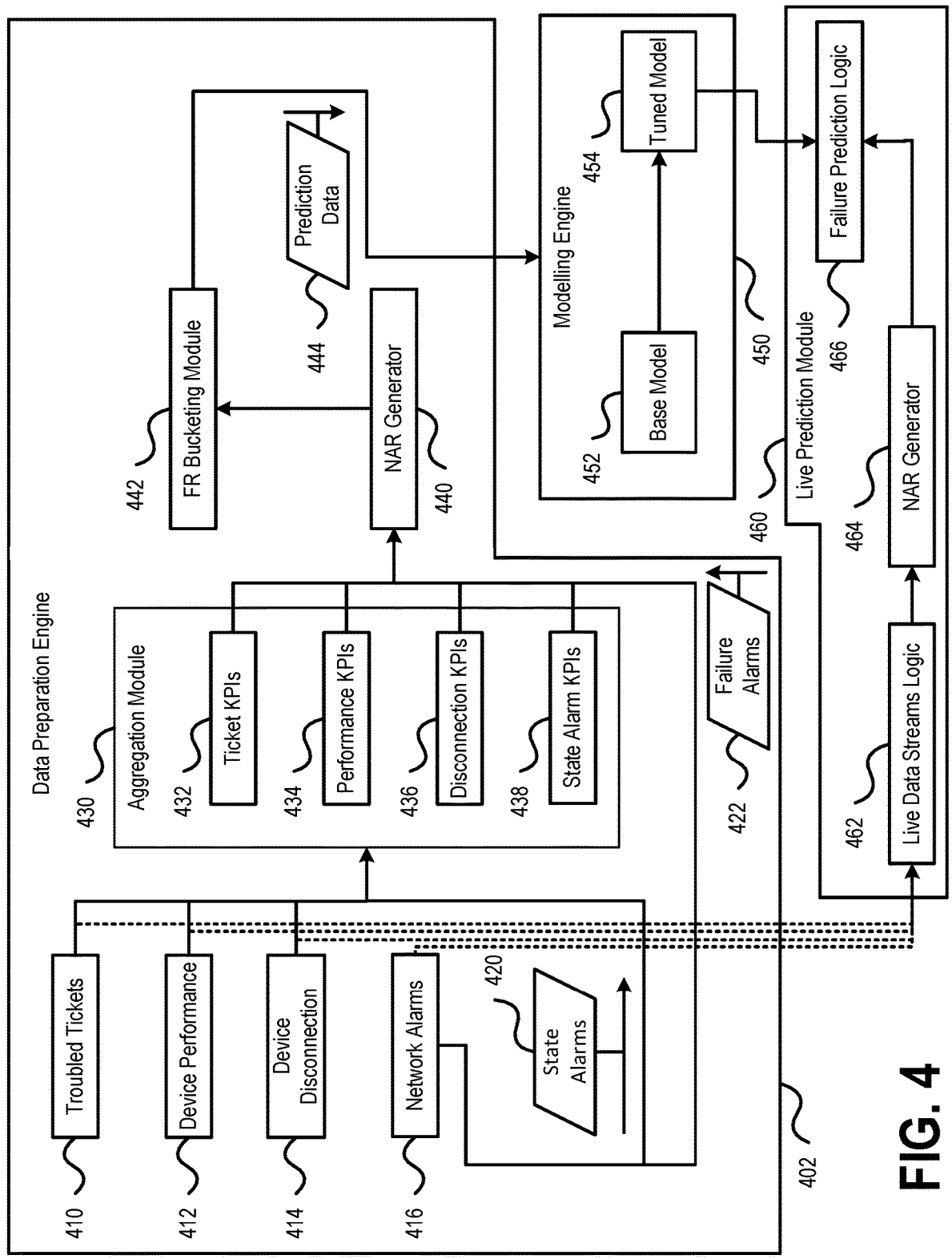
FIG. 4 shows a block diagram illustrating exemplary operations for predicting network failures in accordance with aspects of the present disclosure.

The concepts described above with reference to the network analysis module 130 of FIGS. 1 and 2 will now be described in more detail with reference to FIGS. 4-6. Referring to FIG. 4, a block diagram illustrating exemplary operations for predicting network failures in accordance with aspects of the present disclosure is shown. It is noted that the operations described and illustrated with reference to FIG. 4 may be performed by a network analysis module, such as the network analysis module 130 of FIG. 1 and more specifically, the analytical module 220 of FIG. 2. As illustrated in the exemplary embodiment of FIG. 4, the analytical component may include a data preparation engine 402, a modelling engine 450, and a live prediction module 460.

The data preparation engine 402 may obtain information associated with network nodes from one or more data sources. To illustrate, the information associated with the network nodes may include troubled ticket data 410, device performance data 412, device disconnection data 414, and network alarms data 416. The troubled ticket data 410 may be obtained by the data preparation engine 402 from a ticket management system (e.g., the ticket management module 140 of FIG. 1). The device performance data 412, the device disconnection data 414, and network alarms data 416 may be obtained from a database (e.g., the one or more databases 124 of FIG. 1, such as the historical network information database). As illustrated in FIG. 4, the troubled ticket data 410, the device performance data 412, and the device disconnection data 414 may be provided to a aggregation module 430 of the data preparation engine 402. As described above, the network alarm data 416 may include state alarm data 420 and failure alarm data 422. The state alarm data 420 may be provided to the aggregation module 430 with the troubled ticket data 410, the device performance data 412, and the device disconnection data 414. In the exemplary embodiment illustrated in FIG. 4, the failure alarm data 422 is not provided to the aggregation module 430. However, it is noted that in some embodiments the failure alarm data 422 may also be provided to the aggregation module 430.

The aggregation module 430 may be configured to aggregate the input data (e.g., the troubled tickets data 410, the device performance data 412, the device disconnection data 414, and the status alarm data 420) to produce bucketed data. The bucketed data may include aggregated ticket KPIs 432, aggregated performance KPIs 434, aggregated disconnection KPIs 436, and aggregated state alarm KPIs 438. The bucketed data may be aggregated based on one or more time intervals, such as 1 day, 7 day, 14, day, and 30 day time intervals. For example, the state alarm KPIs 438 may include different types of state alarms and each of the different types of state alarms may occur zero or more times (and often multiple times) over the one or more time intervals. Each of the state alarms may have a time stamp and may be ordered based on the time stamps and arranged into groups based on the one or more different time periods. To illustrate, the state alarm KPIs 438 may be arranged into different columns (e.g., one column for each time period) and within each column the state alarms KPIs 438 may be ordered by timestamps (e.g., state alarm KPIs 438 occurring over a 1 day time period may be ordered based on their respective time stamps in a first column, state alarm KPIs 438 occurring over a 7 day time period may be ordered based on their respective time stamps in a second column, and so on). It is noted that these exemplary time intervals are provided for purposes of illustration, rather than by way of limitation and that different time intervals (i.e., longer or shorter time intervals) and fewer or more time intervals may also be utilized depending on the particular configuration of the aggregation module 430. The bucketed data generated by the aggregation module 430 may be provided to a NAR generator 440. Additionally, the NAR generator 440 may receive failure alarm data 422. The NAR generator 440 may be configured generate NARs based on the bucketed data and the failure alarm data 422. The NARs generated by the NAR generator 440 may include information that correlates KPIs with network events, such as to correlate KPIs of a network node or type of network node with a potential failure event, such as a failure alarm included in the failure alarms data 422. It is noted that additional details regarding generation of NARs are described in more detail below with reference to FIG. 5.

The NARs generated by the NAR generator 440 may be provided to a forward rolling (FR) bucketing module 442. The FR bucketing module may be configured to generate prediction variables suitable for making network failure predictions over one or more future time periods. For example, the FR bucketing module 442 may be configured to produce prediction variables corresponding to 7 day and 14 day time periods (i.e., future time periods). The prediction variables produced by the FR bucketing module 442 may be provided to a modelling engine 450 as prediction data 444.

The modelling engine 450 may utilize the prediction data 444 to test a base model 452. Testing of the base model 452 may include determining a model that provides a threshold fit for the prediction data 444. In an aspect, the base model 452 may be selected from: a neural network, a random forest, XGBOOST, or another type of modelling technique. Based on the testing, the modelling engine 450 may determine the model providing the best fit and may tune parameters of the selected model to produce a tuned model 454. Tuning of the selected modelling technique may include configuring hyperparameters of the tuned model 454, performing KPI selection, or other operations.

Once the tuned model 454 is configured based on the tuning, the tuned model 454 may be plugged in for live prediction analysis. For example, as shown in FIG. 4, a live prediction module 460 may be provided. The live prediction module 460 may include live data streams logic 462 configured to receive data streams of network metrics data, such as the troubled tickets data 410, the device performance data 412, the device disconnection data 414, and the network alarms data 416. It is noted that the data provided to the live prediction module 460 may include recently received or current network metrics data (e.g., the data provided by the monitoring system 180 of FIG. 1), rather than the historical data used by the data preparation engine 402. The live data streams logic 462 may be configured to provide the live data streams of network data to a NAR generator 464. The NAR generator 464 may be configured to generate NARs based on the live data streams (e.g., live NARs) and provide the NARs to failure prediction logic 466. The NARs generated based on the live data streams may include prediction variables that may be evaluated against a trained model to predict network failure events, as described in more detail below. It is noted that additional details regarding generation of NARs are described in more detail below with reference to FIG. 5.

The failure prediction logic 466 may be configured to predict node failures based on evaluation of the live NARs produced by the NAR generator 464 against the tuned module 454 that has been tuned by the modelling engine 450. In an aspect, the failure predictions may be based on a classification of nodes based on the tuned model 454. For example, the tuned model 454 may include information associated with KPIs or other characteristics indicative of historical failure patterns identified during training of the base model 452 and/or the tuning of the tuned model 454. In an aspect, the tuned model 454 may determine the classification of a node based on KPIs or other characteristics (e.g., reflected in the live NARs) over time. For example, the historical patterns may indicate that KPIs or characteristics exhibited by a node that experiences a particular type of failure event may change over a period of time (e.g., one of the periods of time described above with respect to the NAR generator of FIG. 6). When a node exhibits a similar or identical pattern of changing KPIs or characteristics, the tuned model 454 may predict that the node will experience that same failure event. In an aspect, the tuned model 454 may assign confidence scores to the failure predictions. The confidence scores may be determined based on a similarity of the information included in the live NARs to the historic failure patterns identifiable via the tuned model 454. For example, higher confidence scores may be generated based on live NARs containing information about nodes that exhibit KPIs or other characteristics that are more similar to the historical failure patterns, and lower confidence scores may be generated based on NARs containing information about nodes that exhibit KPIs and other characteristics that are less similar to the historical failure patterns.

It is noted that while FIG. 4 shows the functionality provided by an analytical module of embodiments as being provided by the NAR generator 440 and the NAR generator 464, such illustration has been provided for purposes of illustration, rather than by way of limitation and it should be understood that a single NAR generator may be utilized generate the NARs described with reference to FIG. 4. To illustrate, the information used to generate the NARs described as being generated by the NAR generator 440 may be passed from the aggregation module 430 to the single NAR generator (e.g., the NAR generator 210 of FIG. 2) to generate the NARs provided to the FR bucketing module 442. Similarly, the live data streams logic 462 may pass the live data streams of network data to the single NAR generator to generate the NARs provided to the failure prediction logic 466.

Figure 5:
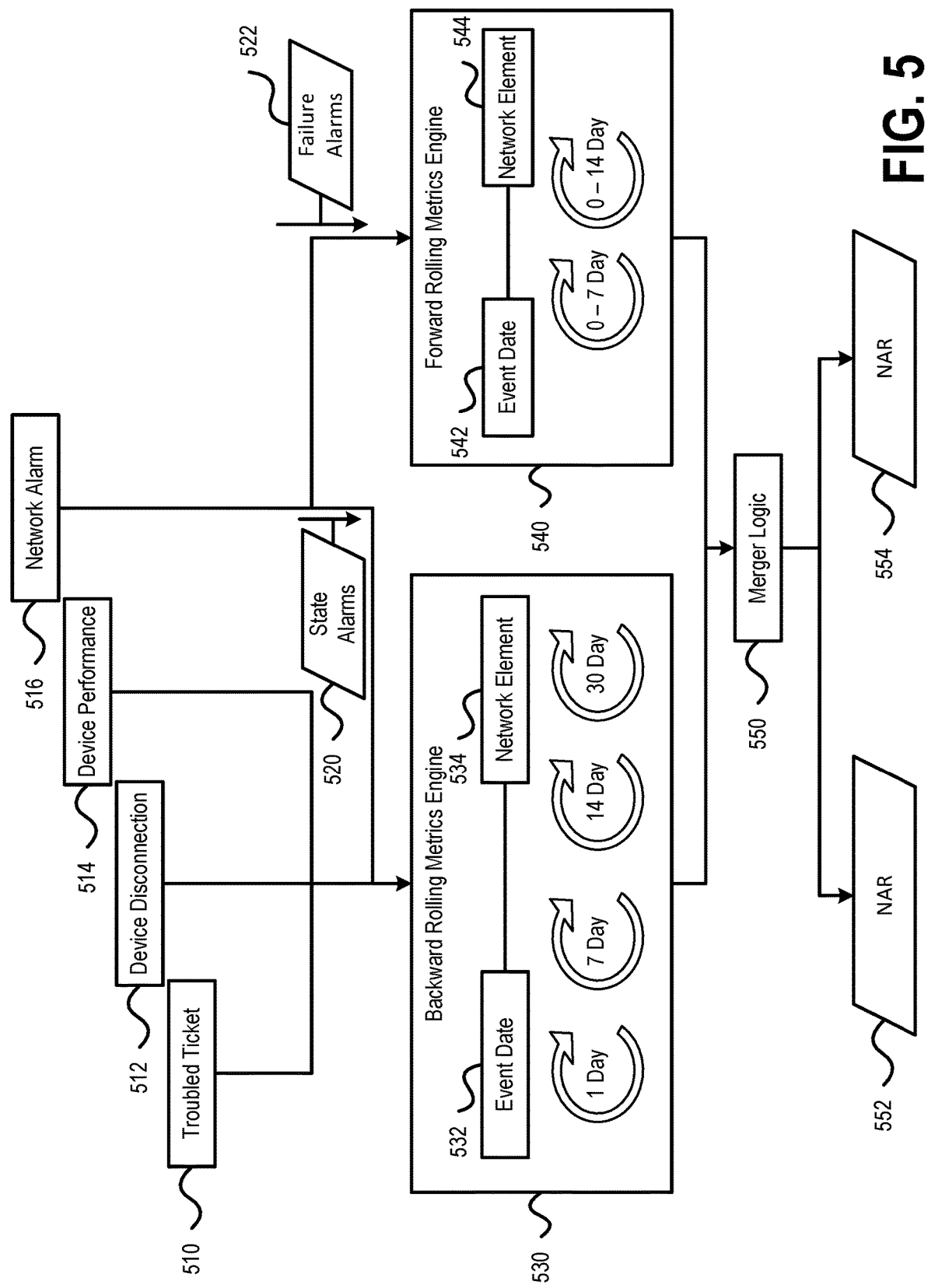
FIG. 5 shows a block diagram illustrating exemplary aspects of a NAR generator in accordance with the present disclosure.

Referring to FIG. 5, a block diagram illustrating exemplary aspects of a NAR generator in accordance with the present disclosure is shown. In an aspect, the operations described with respect to FIG. 5 may be performed by a network analysis module (e.g., the network analysis module 130 of FIG. 1) and more specifically by a NAR generator (e.g., the NAR generator 210 of FIG. 2, the NAR generator 440 of FIG. 4, and the NAR generator 464 of FIG. 4). As shown in FIG. 5, a NAR generator may receive, as input, different types of data that may be utilized to create a set of forward rolling and backward rolling prediction variables that may be used to produce NARs.

As described above with reference to FIG. 4, the different types of data may include troubled ticket data 510, device disconnection data 512, device performance data 514, and network alarm data 516. The troubled ticket data 510 may be received from a ticket management system (e.g., the ticket management module 140 of FIG. 1), as indicated by the arrow 208 of FIG. 2. It is noted that the troubled ticket data 510 provided by the ticket management system may enable a monitoring system (e.g., the monitoring system 180) to improve the models used for predicting failure events over time. For example, as will be described in more detail below, a ticket analysis module (e.g., the ticket analysis module 150 of FIG. 1) may retrieve tickets from the ticket management system, evaluate the tickets (e.g., to determine actions to mitigate predicted failures, etc.), and then provide updated tickets to the ticket management system and a ticket datastore (e.g., the ticket datastore 280 of FIG. 2), as indicated by arrow 204 of FIG. 2. Subsequent NARs generated based on tickets that have been analyzed by the ticket analysis module or resolved based on predicted actions may provide additional information that may enable more accurate predictions of network failure events.

In an aspect, the troubled ticket data 510 may include snapshots of one or more tickets associated with a network (e.g., the one or more networks 170 of FIG. 1). As shown in Table 1, below, the ticket snapshots included in the troubled ticket data 510 may include date information (e.g., a date on which an alarm for which the ticket is created occurred, a ticket open date, a ticket close date, a ticket resolved date, an incident start date, a date one or more repairs under the ticket occurred, etc.), a ticket identifier, a description field, an asset or node identifier (i.e., information identifying a network node associated with the ticket), information associated with an urgency of the ticket, category information, equipment type information, information identifying services and resources affected by the cause of the ticket, and information associated with a synopsis of the ticket. It is noted that the exemplary types of information shown in Table 1 have been provided for purposes of illustration, rather than by way of limitation and the fault mitigation devices in accordance with the present disclosure may operate with less information or more information than is shown in Table 1 in some embodiments.

TABLE 1

Troubled Ticket Data

| Field | Description |
| --- | --- |
| trouble ticket identifier | Ticket id |
| Asset id | Asset for which ticket is created |
| event date | Alarm date for which ticket is created |
| open date | Ticket open date |
| close date | Ticket close date |
| last updated | Last update time stamp for the ticket |
| urgency | Urgency for the ticket |
| resolve date | Ticket Resolve date |
| incident start date | Incident start time - if issue is declared as incident |

TABLE 1-continued

Troubled Ticket Data

| Field | Description |
| --- | --- |
| category | Ticket Category |
| equipment type | Asset Specification |
| restoration date | Repair date |
| service affected | service affected |
| affected resource | affected resource |
| fault synopsis | fault synopsis |

In an aspect, the device disconnection data 512 may include information associated with disconnection events detected on a network (e.g., the one or more networks 170 of FIG. 1). As shown in Table 2, below, the information associated with disconnection events may include a description field, a time the disconnection event occurred, a port number where the disconnection occurred, a date and time when the disconnection occurred, and a date and time when the connection was resumed. It is noted that the exemplary types of information shown in Table 2 have been provided for purposes of illustration, rather than by way of limitation and the fault mitigation devices in accordance with the present disclosure may operate with less information or more information than is shown in Table 2 in some embodiments.

TABLE 2

Disconnection Data

| Field | Description |
| --- | --- |
| event date | Time of occurrence |
| port number | Port number of DSLAM device, where disconnection was encountered |
| start date | Start date/time of Disconnection |
| end date | End date/time of Disconnection |

In an aspect, the device performance data 514 may include snapshots that include information associated with performance of nodes of a network (e.g., the nodes 172, 174, 176 of the one or more networks 170 of FIG. 1). As shown in Table 3, below, the snapshots of node performance may include a description field, an asset identifier that identifies the node, a date the snapshot was created, a type of the asset, location information (e.g., geography data, local exchange data, etc.), information associated with switches connected to the node, service information (e.g., information associated with a total number of devices connected to one or more services provided by the node at the time the snapshot was generated), card information, status information, port information, traffic information, connectivity information (e.g., Internet connectivity, voice connectivity, IPTV connectivity, etc.), subnet information (e.g., registered subs, active subs, disconnected subs, etc.), and connection characteristic information (e.g., speed, line type, etc.). It is noted that the exemplary types of information shown in Table 3 have been provided for purposes of illustration, rather than by way of limitation and the fault mitigation devices in accordance with the present disclosure may operate with less information or more information than is shown in Table 3 in some embodiments.

TABLE 3

Device Performance Snapshot Data

| Field | Description |
|---|---|
| asset id | Asset Identifier |
| event date | Device performance Snapshot date |
| asset type | Asset Type |
| Geography fields | Location related field |
| local exchange | Location related field |
| access switch | Total Access Switch connected to DSLAM |
| edge access switch | Total Edge Access Switch connected to DSLAM |
| service internet | Total active internet connections |
| service voip | Total Devices connected during the time of snapshot |
| service iptv | Total Devices connected during the time of snapshot |
| ds brond | Total Devices connected during the time of snapshot |
| bras | Total Devices connected during the time of snapshot |
| kv | Total Devices connected during the time of snapshot |
| card | card |
| dslam status | dslam status |
| classofservice | classofservice |
| technology | technology |
| speed | speed |
| line type | line type |
| sproto | sproto |
| dsl port status | dsl port status |
| internet cnt | Total Devices connected during the time of snapshot |
| voice cnt | Total Devices connected during the time of snapshot |
| iptv cnt | Total Devices connected during the time of snapshot |
| disconnected subs | disconnected subs |
| registerd subs | registerd subs |
| active subs | active subs |
| traffic up | traffic up |
| traffic down | traffic down |
| up dsl ports | up dsl ports |
| dsl ports | dsl ports |

In an aspect, the network alarm data 516 may include data for alarms aggregated to alarm event window and asset level. As shown in Table 4, below, the network alarm data 516 may include a description field, an alarm identifier, information identifying operational information associated with the asset, an asset identifier (e.g., information identifying the network node(s) associated with the alarm), state information, a date the alarm was generated, alarm text information, status information, flag information, information associated with a user that addressed the alarm (e.g., an IT user that attempted to resolve the condition causing the alarm, etc.), domain information, threshold information (e.g., information associated with one or more KPI thresholds used to trigger the alarm), information identifying entities tagged to the asset, information associated with a cause of the alarm, backup information, security information, severity information, and information identifying a time when an event that triggering the alarm occurred. It is noted that the exemplary types of information shown in Table 4 have been provided for purposes of illustration, rather than by way of limitation and the fault mitigation devices in accordance with the present disclosure may operate with less information or more information than is shown in Table 4 in some embodiments.

TABLE 4

Alarm Data

| Field | Description |
|---|---|
| asset alarm identifier | Alarm ID |
| operation context | Id indicating operational information of the asset |
| asset identifier | Asset ID |
| state | Current State of the Asset |
| event date | Time of Alarms generation |
| alarm type | Type of Alarms |
| alarm text | Text indicating the Actual alarms and count of occurrence |
| problem status | Status of the Problem for Alarm |
| clear flag | Flag indicating above status |
| handled user & time | Operator who acknowledged the alarm - non mandatory field |
| previous state | Pervious State of Asset |
| target entities | Other entities tagged to the Asset |
| probable cause | Cause of Alarm if any |
| security alarm cause | Cause for Security Alarm |
| backed up status | backed up status |
| backup object | backup object |
| alarm threshold | Alarm KPI threshold |
| domain | Domain name |
| security alarm detector | security alarm detector - if available |
| original severity | severity |
| original event time | original event time |

As shown in in FIG. 5, the network alarm data 516 may include state alarm data 520 and failure alarm data 522. The NAR generator may include a backward rolling metrics engine 530 and a forward rolling metrics engine 540. As described above with reference to FIG. 4, the troubled ticket data 510, the device disconnection data 512, the device performance data 514, and the state alarm data 520 may be provided to the backward rolling metrics engine 530. It is noted that the troubled ticket data 510 may be the troubled ticket data 410 of FIG. 4, the device disconnection data 512 may be the device disconnection data 414 of FIG. 4, the device performance data 514 may be the device performance data 412 of FIG. 4, the state alarm data 520 may be the state alarm data 420 of FIG. 4, and the failure alarm data 522 may be the failure alarm data 422 of FIG. 4.

The backward rolling metrics engine 530 may configured to process the input data (e.g., the troubled ticket data 510, the device disconnection data 512, the device performance data 514, and the state alarm data 520), which may include information associated with many different nodes and types of nodes. The processing of the input data may produce buckets of data and derived variables over one or more periods of time, which may be organized on an event 532 and network element 534 basis (e.g., the data is organized based on events and network elements associated with the events). For example, in FIG. 5 the one or more periods of time are shown as including a 1 day time period, a 1 week time period (i.e., the last 7 days), a 2 week time period (i.e., the last 14 days), and a 1 month time period (i.e., the last 30 days). It is noted that the exemplary time periods illustrated in FIG. 5 have been provided for purposes of illustration, rather than by way of limitation and that embodiments of the present disclosure may utilize more time periods or less time periods, as well as time periods having different durations, depending on the particular configuration of the backward rolling metrics engine 530.

As described with reference to FIG. 4, the buckets of input variables and derived variables may be used to produce NARs for predicting network failure events. In an aspect, the buckets of input variables and derived variables may be generated by populating a data structure with information derived from the input data received by the backward rolling metrics engine 530. For example, historic data compiled over a collection time period (e.g., 24 hours) may be used as input data to generate a data bucket associated with a node state. The node state bucket may identify each of the alarm types that occurred within the input data. In an aspect, the buckets of data may be generated in a manner similar to the aggregator 430 of FIG. 4. For example, a given date can have multiple occurrences or alarm states for a given node and occurrences of unique events may be aggregated to form a node state bucket. The node state bucket may then be backward rolled to identify occurrences of the alarms identified in the input data over the one or more time periods, such as the past 1 day, 7 day, 14 days, and 28 days, which may then be used to create alarm buckets. During backward rolling, the number of unique events of occurrences of a given KPI, characteristic, alarm state, etc. may be calculated over the one or more time periods, such as the past 1, 7, 14, 28 days. To illustrate, for KPI-1 the backward rolling may produce information associated with the unique event occurrences for KPI-1 at 1, 7, 14, and 28 days. In an aspect, the unique events may be arranged into columns (e.g., one column for each time period, and each row may include information associated with the unique event occurrences, such as a total number of unique occurrences of the events, and the like).

Similarly, a bucket associated with disconnections may be generated based on the input data (e.g., the device disconnection data 512). The disconnections bucket may be assembled at an event date and node ID level using the input data and then backward rolled to identify disconnection events that occurred over the one or more time periods, such as the past 1 day, 7 days, 14 days, and 28 days. The disconnection events identified based on the backward rolling may be used to create disconnection buckets. Buckets corresponding to troubled tickets and node performance may also be generated. For example, a troubled tickets bucket may be generated based on the troubled tickets data 510 and the bucket associated with node performance may be generated based on the device performance data 514. Once the buckets are generated, they may be backward rolled over the one or more time periods, such as the past 1 day, 7 days, 14 days, and 28 days, and the results of the backward rolling may be incorporated into the troubled tickets bucket and node performance bucket, respectively.

The forward rolling metrics engine 540 may generate a bucket associated with the failure alarms 522. In an aspect, failures predicted to occur over one or more future time periods (e.g., 7 or 14 days in the future) may be determined during the forward rolling. To illustrate, for a network element NE1 and a NAR with a reference date Jan. 1, 2021, aggregate future failure instances of NE1 in 7 days and 14 days in the future may be calculated. The failure predictions over the different future time periods provide prediction variables for occurrences of the failure by the network element NE1 over the next 7 days and 14 days in the future. It is noted that NAR generators in accordance with the present disclosure may be configured to utilize extract, transform, load (ETL) techniques to generated the above-described buckets.

Once the buckets of variables are generated, the buckets may be provided to merger logic 550. The merger logic 550 may be configured to generate a NAR 552 and a NAR 554 based on the buckets. To generate the NAR 552, the merger logic 550 may merge data from the node state bucket, the disconnections bucket, the troubled tickets bucket, and the node performance bucket. To illustrate, the merger logic 550 may be configured to merge information from the node identifier (i.e., information identifying a network node) and date level, thereby allowing events associated with different nodes to be associated with particular dates and consolidating the information stored in the node state frame, disconnections frame, the troubled tickets frame, and the node performance frame within a single data structure—the NAR 552. Similarly, the NAR 554 may be generated based on the failure alarms frame at the node identifier (i.e., information identifying a network node) and date level, thereby allowing failure events associated with different nodes to be associated with particular dates and consolidating the information stored in the failures frame within a single data structure.

As briefly described above, the NARs 552, 554 may be used to select a model (e.g., the base model 452 of FIG. 4). In an aspect, the base model may be selected from among a plurality of different types of models, as described above. The selection of the base model may be based on an evaluation of how well the model fits the NARs 552, 554. The model fit may indicate how well the model associates the information included in the NAR 552 with failure events identified in the NAR 554. It is noted that because the NAR 552 and the NAR 554 provide different prediction horizons (e.g., 7 days and 14 days into the future, respectively), the NARs 552, 554 may help evaluate the criticality of predicted failures and prioritize actions to mitigate failures (e.g., failures predicted to occur sooner may be prioritized over later failures). Once a model providing a suitable fit is selected, the model may be tuned to produce a new model (e.g., the tuned model 454) that may be provided to a live prediction module (e.g., the live prediction module 460 of FIG. 4). The live prediction module may evaluate live NARs (e.g., NARs generated based on live or current network node KPIs and characteristics) against the trained model to predict the occurrence of one or more future network failure events, as described above with reference to the live prediction module 460 of FIG. 4.

Referring back to FIG. 2, the live failure predictions generated by the analytical module 220 may be provided to the orchestration module 230 for processing. The orchestration module 230 may use the confidence scores assigned to each failure prediction received from the live prediction module of the analytical module 220 to channelize or route the failure predictions to different locations (e.g., the ticket creation module 270, the validation module 240, or the diagnostic module 250) for further processing and/or analysis. Utilizing the orchestration module 230 to intelligently route failure predictions to different destinations for further analysis via the validation module 240 the diagnostic module 250, or automated ticket creation via the ticket creation module 270 may enable the concepts disclosed herein to be more easily integrated into legacy systems. For example, routing of failure predictions may be controlled by configuring confidence score ranges with different destinations, thereby allowing existing (legacy) ticket generation techniques to be utilized to address some types of failure predictions while allowing other failure predictions to be subjected to automated or manual diagnostic testing, validation, or other verification processes prior to ticket creation. Moreover, such capabilities may be provided without compromising on accuracies for complex scenarios that may be predicted with lower confidence.

Figure 6:
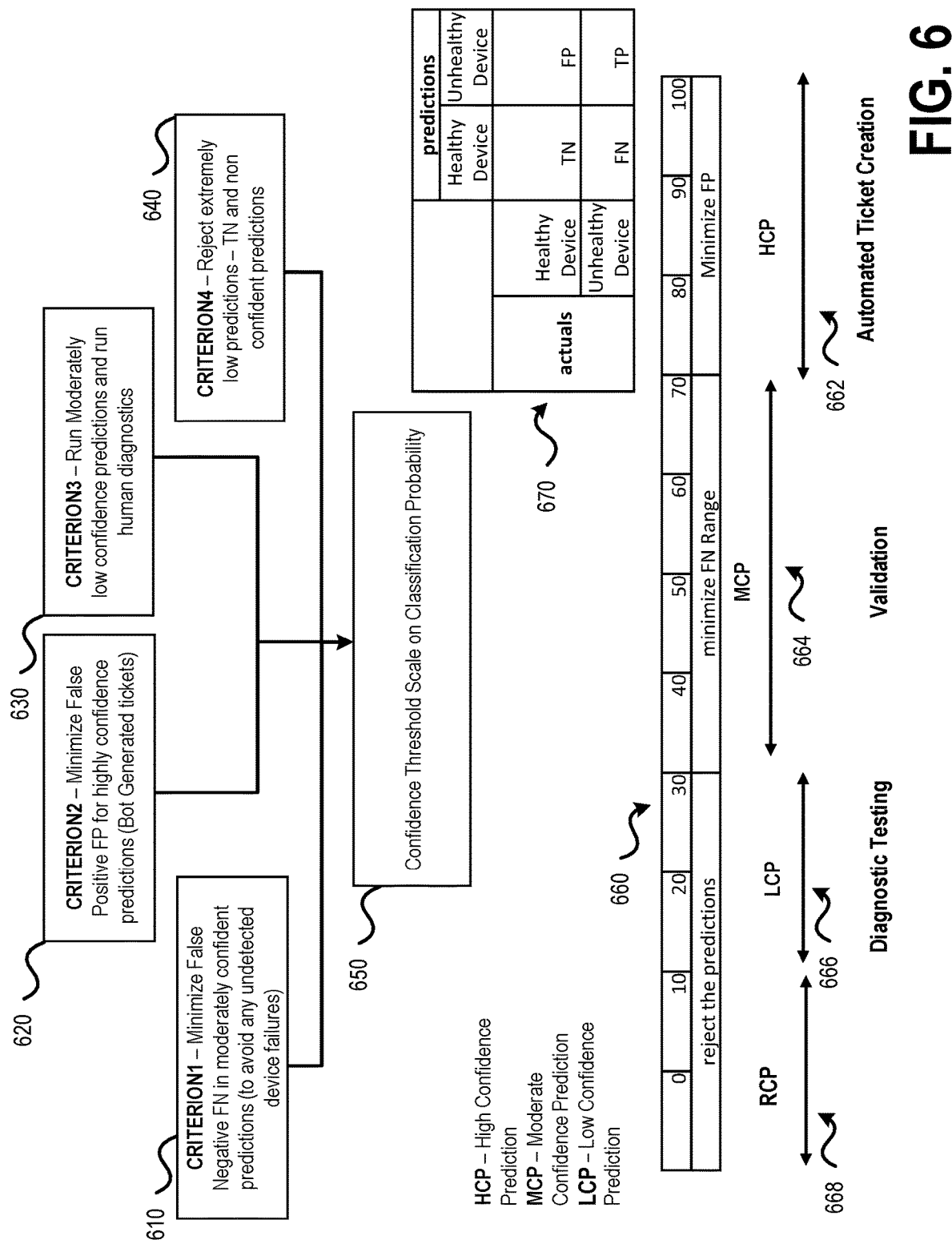
FIG. 6 shows a block diagram illustrating an exemplary conceptual framework for performing orchestration in accordance with aspects of the present disclosure.

Referring briefly to FIG. 6, a block diagram illustrating an exemplary conceptual framework for performing orchestration in accordance with aspects of the present disclosure is shown. In an aspect, the conceptual framework and functionality described with respect to FIG. 6 may be provided by an orchestration module (e.g., the orchestration module 230 of FIG. 2). As shown in FIG. 6, the conceptual orchestration framework may be based on a set of criteria 610, 620, 630, 640 outlining principles or goals that should be achieved via the use of confidence scores and thresholds associated with failure predictions during orchestration. The criterion 610 indicates that false negative (FN) predictions should be minimized in the calculated confidence scores and the criterion 620 indicates that false positive (FP) predictions should be minimized in the calculated confidence scores. In other words, FN or FP predictions should not be associated with high confidence scores. Minimizing FN predictions may help avoid node failures going undetected and minimizing FP predictions may help reduce unnecessary tasks, such as performing diagnostics or manual validation processes on healthy nodes. The criterion 630 indicates that predictions having a moderately low (e.g., based on a particular range on the scale described below) confidence scores may be candidates for diagnostic analysis (e.g., via the validation module 240 of FIG. 2) and the criterion 640 indicates that predictions having very low confidence scores should not be trusted and are candidates for manual validation by a user (e.g., an IT person or network engineer) to verify the predicted failure prior to ticket generation, such as via the validation module 250 of FIG. 2.

Table 670 illustrates that FN predictions may occur when a node of the network is predicted to be healthy and the actual state of the node is unhealthy (i.e., exhibiting signs of failure or has failed). Table 670 also illustrates that FP predictions may occur when a node is predicted to be unhealthy when it is actually healthy (i.e., has not failed and exhibits no signs of failure). Table 670 also shows that a true positive (TP) prediction may occur when a node is predicted to be unhealthy (i.e., exhibiting signs of failing or has failed) and is actually unhealthy, and that true negative (TN) predictions may occur when a node is predicted to be healthy (i.e., has not failed and exhibits no signs of failure) and is actually healthy. It is to be appreciated that minimizing FN and FP failure predictions may result in a higher occurrence of TP and TN failure predictions, which may improve the overall efficiency of the system and handling of predicted failures. For example, TN predictions may require minimal, if any, further processing since they represent actual healthy nodes and TP predictions may require less diagnostic testing and validation in some cases (e.g., well-known failures, failures that may be corrected automatically, etc.). It is noted that the FN and FP predictions may occur due to classification capabilities of the model used to generate the confidence scores. For example, a node may exhibit a small number of KPIs or characteristics that are similar to a historic failure pattern and due to those similarities the node may be predicted to experience a failure event corresponding to the historic failure pattern. The predicted failure event may be an FP prediction due to the small number of KPIs or characteristics that match or are similar to the historic failure pattern. Additionally, the confidence score assigned to the failure prediction for the node in this example may be low due to the small number of KPIs or characteristics that match or are similar to the historic failure pattern. It is noted that FN predictions may also occur under similar circumstances or for other reasons. Over time the number of FN predictions and FP predictions may be reduced through improved training and tuning of the model(s) used to perform live predictions.

The principles provided by the criteria 610, 620, 630, 640 and the concepts described with reference to the Table 670 may be used to construct a confidence threshold scale 650 that may be used to determine how predicted failures are handled by the orchestration module. An exemplary confidence threshold 660 is shown in FIG. 6 as including a high confidence prediction (HCP) range 662, a moderate confidence prediction (MCP) range 664, and a low confidence prediction (LCP) range 666. The HCP range 662 may include confidence scores having values between 71 and 100, the MCP range 664 may include confidence scores having values between 31 and 70, and the LCP range 666 may include confidence scores having values between 11 and 30. Failure predictions associated with confidence scores below the LCP range 666 may fall into a rejected confidence prediction (RCP) range 668. It is noted that the exemplary confidence threshold scale 660 has been provided for purposes of illustration, rather than by way of limitation and that confidence threshold scales in accordance with the present disclosure may include more than 4 ranges or less than 4 ranges, and may also include range values other than those explicitly shown in FIG. 6 (e.g., an HCP range may be defined to include confidence scores between 90 and 100, an MCP range may be defined to include values other than 31-70, and the like).

The confidence threshold scale 650 (or exemplary scale 660) may be used by the orchestration module to route failure predictions for further processing. For example, failure predictions associated with confidence scores within the HCP range 662 may be routed to a ticket creation module (e.g., the ticket creation module 270 of FIG. 2) that automatically creates a ticket associated with the predicted failure. Failure predictions associated with confidence scores within the MCP range 662 may be routed to a validation module (e.g., the validation module 240 of FIG. 2) where the predicted failure may be further analyzed and validated prior to ticket creation (e.g., via the ticket creation module 260 of FIG. 2). Failure predictions associated with confidence scores within the LCP range 666 may be routed to a validation module (e.g., the diagnostic module 250 of FIG. 2) where the predicted failure may be further analyzed via manual or automated diagnostic testing or other processes prior to ticket creation (e.g., via the ticket creation module 260 of FIG. 2). Failure predictions associated with confidence scores within the RCP range 668 may be rejected (i.e., no further analysis or processing may be performed).

Utilizing the confidence scale ranges to orchestrate or channelize failure predictions for further processing may improve the overall efficiency of a fault mitigation device (e.g., the fault mitigation device 110 of FIG. 1). For example, utilizing automated ticket creation for failure predictions having high confidence scores may streamline creation of tickets having a high likelihood of representing actual failures and may reduce the number of tickets that are created for FN predictions and FP predictions. Additionally, performing additional diagnostics and analysis of failure predictions associated with confidence scores within the MCP range 664 and LCP range 666 may enable failure predictions to be vetted to evaluate the validity of those predicted failures prior to generating tickets associated with those failure predictions. The additional vetting of those failure predictions via diagnostics and other validation procedures may enable FN and FP predictions to be weeded out and prevent a technician from spending time addressing non-existent failure conditions. It is noted that tickets may be created for any failure predictions survive the additional vetting procedures and those tickets may be more likely to be associated with actual potential failure events. Moreover, discarding failure predictions that fall within the RCP range 668 may prevent resources (e.g., diagnostic resources, personnel resources, etc.) used to perform the vetting of failure predictions from being allocated to investigating predicted failure events that have a high likelihood of being FN or FP predictions.

Referring back to FIG. 2, the diagnostic module 250 may be configured to conduct diagnostic testing of one or more nodes to validate some failure predictions (e.g., failure predictions associated with confidence scores falling within the LCP range 666 of FIG. 6). For example, the diagnostic module 250 may be configured to request information from a node associated with a failure prediction, such as one or more of the KPIs described above with respect to Table 3 or other information. The information provided by the node may then be analyzed to evaluate whether the node is likely to experience the predicted failure event. If the diagnostic module 250 determines that the node is likely to experience a failure event (e.g., based on abnormal performance metrics, one or more performance thresholds being exceeded, etc.), the diagnostic module 250 may provide the failure prediction to the ticket creation module 260. In an aspect, the diagnostic module 250 may also provide information derived or obtained during the diagnostic testing of the node to the ticket creation module 260. In an aspect, the diagnostic testing performed via the diagnostic module 250 and ticket creation based on the diagnostic testing may correspond to legacy process-based manual diagnostic and ticket creation processes. It is noted that over time, issues requiring the diagnostic module 250 and the ticket creation module 260 may become better understood and subsequent occurrences of those issues may be handled via the ticket creation module 270 and the automated analysis and ticket creation processes of the present invention. For example, as described elsewhere herein, as problems are diagnosed and correct, feedback may be generated that may be ingested by the system and which may allow the system to learn from that network behavior and more efficiently diagnose subsequent occurrences of those events over time.

The validation module 250 may be configured to facilitate manual validation of failure predictions. For example, the validation module 250 may be configured to present information associated with a failure prediction to a user (e.g., IT personnel, network technicians, and the like). The information may be presented to the user via an application (e.g., a web-based application provided via a web browser or a standalone application running on a processor enabled device (e.g., the user device 190 of FIG. 1), such as a personal computing device, a tablet computing device, a laptop computing device, or other types of devices. The presented information may include the KPI information or characteristics associated with the node corresponding to the failure prediction or other types of information that may enable the user to evaluate the validity of the predicted failure event. In some aspects, the application may enable the user to initiate requests for information from the node, provide access to remote data collection tools, or other types of data collection and presentation functionality that may aid the user in validating the predicted failure event. If the user determines that the failure event is credible, the user may transmit the failure prediction to the ticket creation module 260. If the user determines that the failure event is not credible, the user may cancel or otherwise remove the failure prediction and no ticket will be created.

The ticket creation modules 260, 270 may be configured to generate tickets based on received failure predictions. The ticket creation module 260 may be configured to generate tickets based on failure predictions (and possibly other data) received from the analysis modules 240 or the diagnostic module 250. The ticket creation module 270 may be configured to generate tickets based on failure predictions received from the orchestration module 230. The tickets generated by the ticket creation modules 260, 270 may include information associated with the failure predictions, such as information identifying the predicted failure event, the node associated with the failure event, the confidence score, information derived by the diagnostic evaluation or other validation processes, and the like. In some aspects, the tickets may also include additional information, such as a device configuration of the node, a type of the node, a topology of the network or portion of the network supported by the node, device performance metrics, and the like. It is noted that specific types of information that may be stored in the tickets generated by the ticket creation modules 260, 270 have been provided for purposes of illustration, rather than by way of limitation and that tickets generated in accordance with the concepts disclosed herein may include more information, less information, or other types of information than the specific examples described herein.

As briefly described above, the tickets generated by the ticket creation modules 260, 270 may be stored in the ticket datastore 280 and as indicated by arrow 206, transmitted to a ticket management system (e.g., the ticket management module 140 of FIG. 1). It is noted that storing the tickets in the ticket datastore 280 has been shown for purposes of illustration, rather than by way of limitation and that in some embodiments tickets may only be stored in the ticket management system. However, it is noted that embodiments utilizing the ticket datastore 280 to store tickets associated with a monitored network may enable the tickets to be retrieved by a fault mitigation device (e.g., the fault mitigation device 110 of FIG. 1) locally (i.e., from a local memory, such as the memory 120 of FIG. 1) or from a local network accessible memory (e.g., a network access storage (NAS) device, a database server, etc.). Such capabilities may enable fault mitigation systems to monitor large scale and distributed networks according to the concepts disclosed herein in a distributed manner. For example, fault mitigation devices (e.g., the fault mitigation device 110 of FIG. 1) may be provided at many different geographic locations associated with the monitored network(s) and one or more ticket management systems (e.g., servers, cloud-based services, devices, etc. providing the functionality of the ticket management module 140 of FIG. 1) may be used to provide a centralized storage of network tickets. Tickets corresponding to nodes may be stored in ticket datastores of the fault mitigation devices associated with the locations of the nodes (e.g., a ticket associated with a node in a first geographic location may be stored at a ticket datastore of a fault mitigation device serving the first geographic location and a ticket associated with a node in a second geographic location may be stored at a ticket datastore of a fault mitigation device serving the second geographic location).

Referring back to FIG. 1, the one or more tickets generated by the network analysis module 130 (e.g., via the ticket creation module 260 and the ticket creation module 270) may be provided to the ticket management module 140. It is noted that FIG. 1 shows the ticket management module 140 as being part of the fault mitigation device 110 for purposes of illustration, rather than by way of limitation and that the functionality described with reference to the ticket management module 140 may be provide by a device (e.g., a server, etc.) or service (e.g., a cloud-based service, etc.) that is external to the fault mitigation device 110 in some embodiments, as described above. The tickets may be stored in the one or more databases 124 stored at the memory 120 (or another memory in embodiments where the fault mitigation device 110 is external to the fault management device).

In an aspect, tickets stored at the tickets database associated with the fault mitigation device 110 may be periodically updated with additional information. To illustrate, once a ticket is created it may be assigned or provided to a user (e.g., IT personnel, a network technician, etc.) who may take actions to resolve the cause of the ticket. As the user works to resolve the ticket the user may input notes into the ticket, such as to describe any issues that the user observed, information associated with any problems identified while handling the ticket, actions take to correct or otherwise resolve the problem(s), or other information. It is noted that while some of the tickets received by the ticket management module 140 may be assigned for resolution by users, other tickets may be handled via automated processes. For example, a node of the one or more networks 170 may experience a failure that may be resolved by simply rebooting the node, updating software of the node, or other types of operations that may be initiated automatically (e.g., by sending commands to the node). Additionally, some tickets may not require any action and may not be assigned to a user or result in any actions being taken. As an illustrative example, a node (e.g., a DSLAM) may periodically become disconnected from the one or more networks 170, but may reestablish the connection to the network after a short period of time (e.g., 10 seconds, 30 seconds, 1 minute, 3 minutes, or 1-5 minutes).

As will be described in more detail below, the ticket analysis module 150 may be configured to analyze the tickets stored by the ticket management module 140 and based on the analysis, determine actions that should be taken to resolve the tickets. For example, the ticket analysis module 150 may predict an action or actions that may be taken to resolve the root cause of the failure associated with a ticket. If the action(s) can be performed automatically, the ticket analysis module 150 may update the ticket to include the action(s) and provide the updated ticket back to the ticket management module 140 (e.g., for automated action processing). If the ticket requires a user to perform the action(s) predicted to resolve the cause of the failure, the ticket analysis module 150 may update the ticket to include the recommended actions and transmit the ticket to the user or to the ticket management module 140 for assignment to the user. Furthermore, if the ticket does not require any action, the ticket management module 150 may update the ticket to indicate that no action is required and then provide the updated ticket to the ticket management module 140. In some aspects, when a ticket is determined to require no action, the ticket analysis module 150 may set a flag or otherwise include information in the ticket that indicates the node associated with the ticket should be checked on at a later time in order to make sure that the cause of the ticket was resolved without intervention. If it is later discovered that the cause was not automatically resolved, the ticket may then be transmitted to a user for further action.

Figure 3:
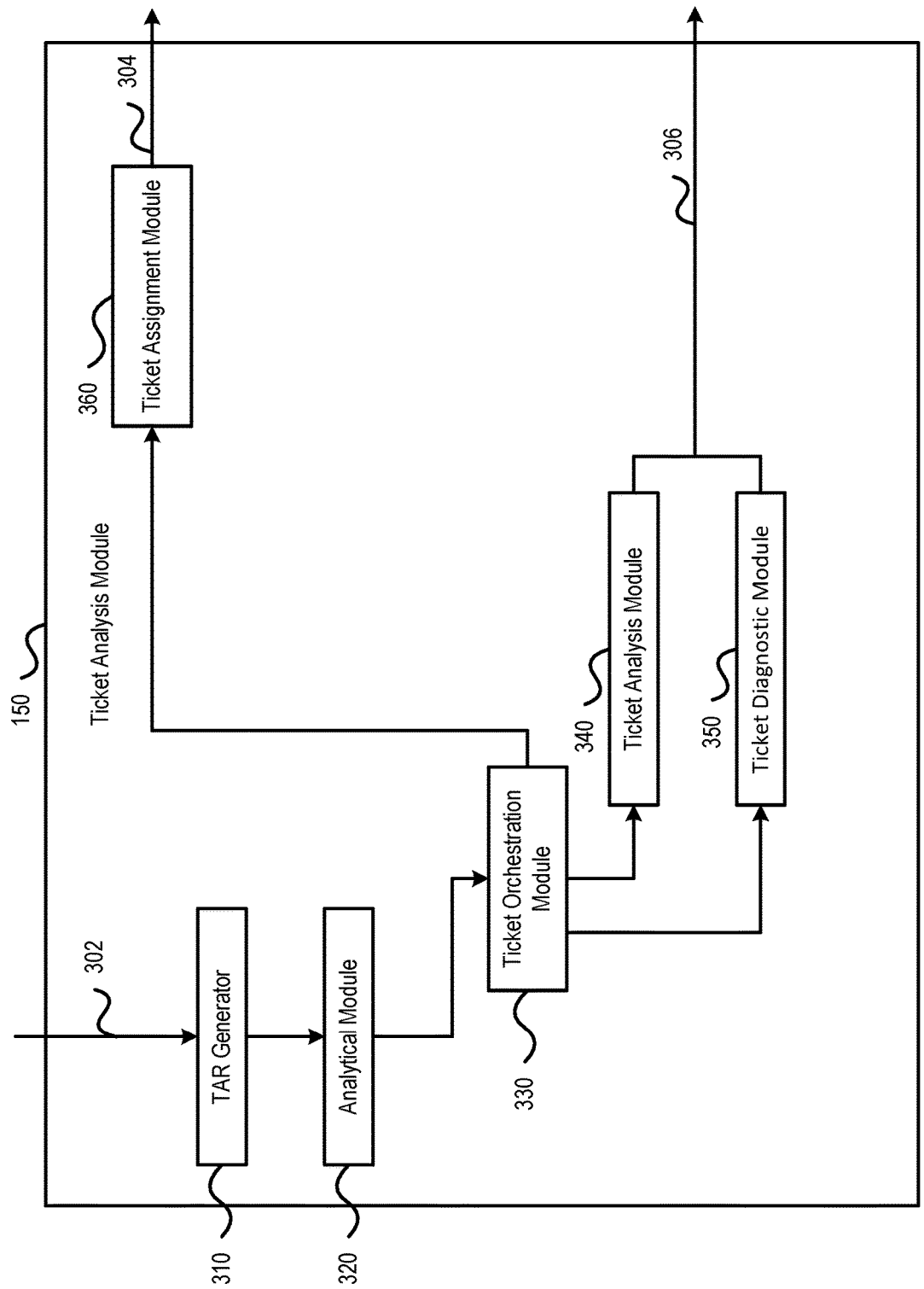
FIG. 3 shows a block diagram illustrating exemplary aspects of a ticket analysis module in accordance with the present disclosure.

To further illustrate the functionality of the ticket analysis module 150 and with reference to FIG. 3, a block diagram illustrating exemplary aspects of a ticket analysis module in accordance with the present disclosure is shown. As shown in FIG. 2, the ticket analysis module 150 may include a ticket analytical record (TAR) generator 310, an analytical module 320, a ticket orchestration module 330, ticket validation module 340, tick diagnostic module 350, and a ticket assignment module 360. The TAR generator 310 may operate to provide functionality similar to the functionality described above with respect to the NAR generator 210 of FIG. 2 and described in more detail with reference to FIGS. 4 and 5. However, rather than operating to analyze network data (e.g., KPIs, node characteristics, etc.), the TAR generator 310 may be configured to analyze ticket information. For example, the ticket analysis module 150 may be configured to retrieve tickets from a ticket management module (e.g., the ticket management module 140 of FIG. 1), as indicated by arrow 302.

Figure 9:
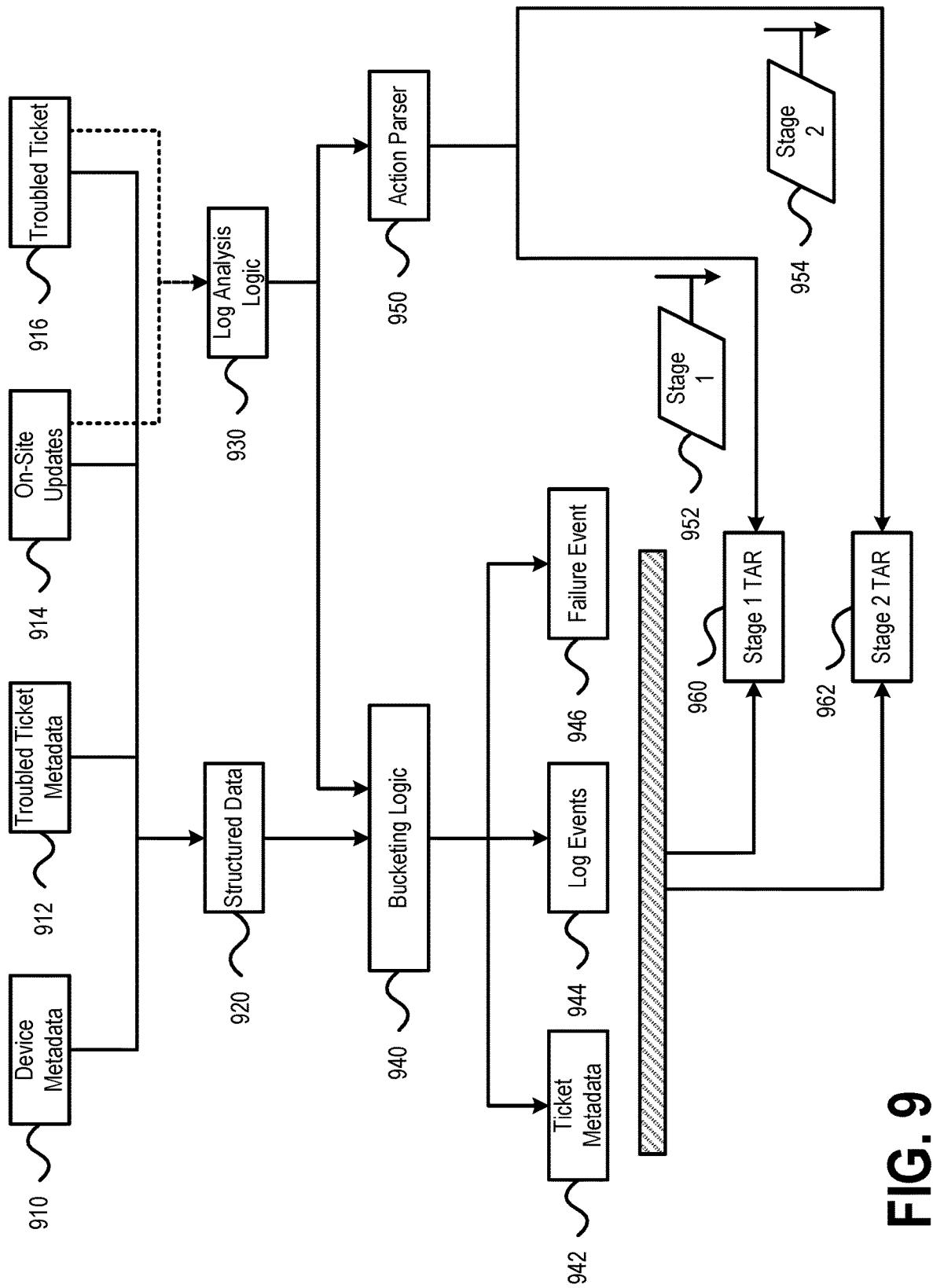
FIG. 9 shows a block diagram illustrating exemplary aspects of a TAR generator in accordance with the present disclosure.

To further illustrate the functionality provided by the TAR generator 310 and with reference to FIG. 9, a block diagram illustrating exemplary aspects of a TAR generator in accordance with the present disclosure is shown. As shown in FIG. 9, the TAR generator may be configured to generate TARs based on different types of input data, which may include device metadata 910, troubled ticket metadata 912, on-site update information 914, and troubled ticket data 916. In an aspect, at least a portion of the device metadata 910, the troubled ticket metadata 912, the on-site update information 914, and the troubled ticket data 916 may be obtained from live data (e.g., data associated with unresolved tickets). The device metadata 910 may include device type related information associated with the nodes corresponding to the troubled ticket data 916, such as information indicating a type of the node (e.g., an IoT node, an edge node, etc.), topology in which the device or node is connected, a number of downstream devices connected to the node (e.g., available through device performance data), or other types of information associated with the nodes. The troubled ticket metadata 912 may include information such as a time the ticket was created, category or type information (e.g., a category or type of failure, etc.), a duration of the ticket (e.g., an amount of time from the time the ticket was created until it was resolved or closed), or other types of information about the ticket(s). The on-site update data 914 may include information provided via updates to the ticket, such as updates provided by a user when attempting to resolve the ticket or other types of information. The troubled tickets data 916 may correspond to tickets obtained from a ticket management module (e.g., the ticket management module 140 of FIG. 1).

As illustrated in FIG. 4, the device metadata 910, the troubled ticket metadata 912, the onsite update data 914, and the troubled tickets data 916 may be provided as input data to bucketing logic 940. The bucketing logic 940 may also be configured to receive log data extracted from the on-site update information 914 and the troubled tickets data 916 by log analysis logic 930. The log information may include information associated with service logs of the nodes corresponding to each ticket, actions or action categories associated with each ticket, or other types of information.

It is noted that the bucketing logic 940 may be configured to generate the bucketed data based on structured data 920. It is noted that portions of the input data (e.g., the device metadata 910, the troubled ticket metadata 912, the on-site update data 914, the troubled tickets data 916, and the log data produced by the log analysis logic 930) may include unstructured data. For example, unstructured log data generated by onsite service engineers may include notes or other information about observations made in the field by the service engineers to revolve problems. In some aspects, information derived from such unstructured data may be used for TAR creation, such as via the action miner described in more detail below. The bucketing logic 940 may be utilize ETL techniques to generate the bucketed data, shown in FIG. 9 as including a ticket metadata bucket 942, a log events bucket 944, and a failure events bucket 946. The ETL techniques utilized by the bucketing logic 940 may involve extracting the input data from the relevant data sources, such as retrieving the troubled ticket data 916 from the ticket management module 130, retrieving the device metadata 910 from the one or more databases 124 of FIG. 1, and the like.

Once the input data has been obtained, the bucketing logic 940 may apply a set of rules to the input data. The set of rules may be configured to cleanse the input data, which may include removing extraneous information (e.g., unstructured data) from the input data. The set of rules may also be configured to apply one or more transformations to the input data, such as data aggregation, joining or combining data from multiple data sources (e.g., incorporating a portion of the device metadata 910 into other portions of the input data), calculating new data values (e.g., a count of total tickets associated with different error types), or other types of data processing. Thus, it is to be appreciated that all of the input data may not be included in the ticket metadata bucket 942, the log events bucket 944, and the failure events bucket 946. It is noted that FIG. 9 shows the bucketing logic 940 as producing 3 buckets of data (e.g., ticket metadata bucket 942, the log events bucket 944, and the failure events bucket 946) for purposes of illustration, rather than by way of limitation and that more buckets or less buckets may be used in accordance with the concepts disclosed herein. For example, in some embodiments, buckets related to tickets, node repair/service, ticket duration, ticket turnaround time (TAT), downstream impact, priority, or a combination of the exemplary buckets disclosed herein may be created.

In addition to generating the bucketed data, the TAR generator shown in FIG. 9 may also be configured to generate prediction variables. For example, the log data generated by the log analysis logic 930 may be processed by an action parser 950. The action parser 950 may be configured to identify actions based on the log data and a dictionary (e.g., the dictionary 738 of FIGS. 7 and 8). The actions may include stage 1 actions 952 and stage 2 actions 954. The stage 1 actions 952 may be associated with self-healable tickets, such as tickets generated based on failure events that will automatically be resolved (e.g., the failure is intermittent or occurs periodically and the node will return to healthy or normal operating state automatically). Stage 2 actions 954 may be associated with non-self-healable tickets involving failure events that will not be corrected automatically (i.e., some action must be performed to prevent or resolve the failure). In an aspect, stage 2 actions may include actions across a plurality of action categories (e.g., 32 categories).

Once the bucketed data is created by the bucketing logic 940 and the stage 1 and stage 2 actions are identified by the action parser 950, information included in the various buckets may be combined to produce the TARs. In an aspect, the TARs may include a stage 1 TAR 960 and a stage 2 TAR 962. The stage 1 TAR 960 may be associated with stage 1 actions 952 and the stage 2 TAR 962 may be associated with stage 2 actions 954. Each of the TARs 960, 962 may incorporate information from the bucketed data. For example, the TARs 960, 962 may include information from the ticket metadata bucket 942, the log events bucket 944, and the failure events bucket 946. Additionally, the TAR 960 may associate the stage 1 actions 952 with portions of the information derived from the ticket metadata bucket 942, the log events bucket 944, and the failure events bucket 946, and the TAR 962 may associate the stage 2 actions 954 with portions of the information derived from the ticket metadata bucket 942, the log events bucket 944, and the failure events bucket 946. It is noted that the association between the derived information and the stage 1 actions 952 and the stage 2 actions 954 may enable a ticket analysis module (e.g., the ticket analysis module 150 of FIGS. 1 and 3) to perform live predictions of actions that may mitigate or resolve failure events predicted for nodes of a network, as described in more detail below. It is noted that TARs may also be generated for purposes of training a model used to predict actions.

Referring back to FIG. 3, the analytical module 150 may be configured to perform various operations to identify actions for mitigating or resolving node failure events based on tickets stored by a ticket management system (e.g., tickets stored at the ticket management module 140 of FIG. 1 and generated by the network analysis module 130, as described above). To identify the actions, the analytical module 150 may include an action miner that includes logic and functionality for analyzing ticket data, which may include natural language data, to identify actions within historical ticket data (e.g., resolved or closed tickets). The actions identified by the action miner may be used to create a dictionary of actions. The dictionary of actions may be utilized by an action parser of the analytical module 320 to determine actions predicted to resolve failure events associated with live (i.e., unresolved or open) ticket data streams.

Figure 7:
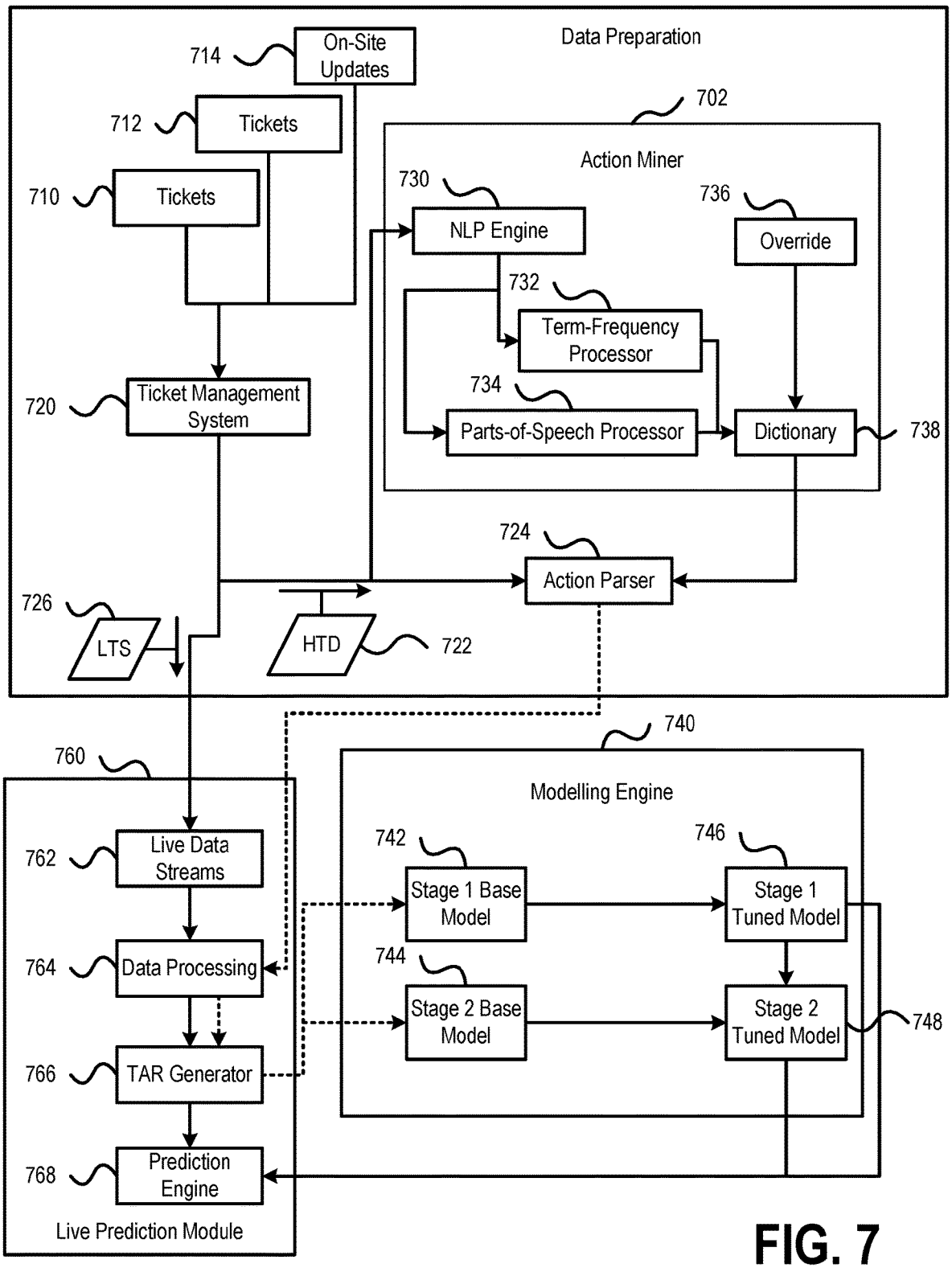
FIG. 7 shows a block diagram illustrating exemplary aspects of an analytical module for predicting actions to resolve network failures in accordance with the present disclosure.

The above-described processes and functionality of the analytical component 150 are illustrated in more detail with reference to FIG. 7, which shows a block diagram illustrating exemplary aspects of an analytical module for predicting actions to resolve network failures in accordance with the present disclosure. As shown in FIG. 7, operations of the analytical module (e.g., the analytical module 320 of FIG. 3) may include a data preparation phase. During the data preparation phase, historical ticket data (HTD) 722 may be provided to an action miner 702 by a ticket management system 720. In an aspect, the ticket management system 722 may be the ticket management module 140 of FIG. 1. In an additional or alternative aspect, the ticket management system 720 may be a standalone ticket management system or device (i.e., separate from a fault a management device) or a cloud-based system for providing ticket management functionality. The historical ticket data 722 may include tickets 710, tickets 712, and on-site update information 714. In an aspect, the tickets 710 may be generated by the ticket creation module 270 of FIG. 2 (i.e., automatically created tickets), the tickets 712 may be generated by the ticket creation module 260 of FIG. 2 (e.g., tickets created at a network operations center (NOC) by a user), and the on-site update information 714 may include information provided by a technician to update a ticket (e.g., information associated with actions taken or other observations by the technician when addressing a failure or predicted failure associated with a previously generated ticket).

The action miner 702 may include a natural language processing (NLP) engine 730, a term processor 732, a speech processor 734, override logic 736, and a dictionary 738. The NLP engine 730 may be configured to perform pre-processing of the historical ticket data 722. For example, the historical ticket data 722 may include text written in more than one language (e.g., English, Chinese, German, French, Spanish, etc.) and the pre-processing performed by NLP engine 730 may include translating the text of the historical ticket data 722 to a single language. The action miner 702 may also include a term processor 732 and a speech processor 734. The term processor 732 may be configured to extract actions from the text of the historical ticket data 722 and the speech processor 734 may be configured to extract dependency information (e.g., a verb linked to a noun, such as replace equipment) from the text of the historical ticket data 722. The outputs of the term processor 732 and the speech processor 734 may be utilized to construct the dictionary 738. It is noted that the above-described functionality of the action miner 702 is described and illustrated in more detail below with reference to FIG. 8.

The analytical module may also include an action parser 724. As briefly described above with reference to FIG. 9, the action parser 724 may be configured to extract actions from ticket data, such as the historical ticket data 722. The action parser 724 may utilize the dictionary 738 to identify and extract the actions from the historical ticket data 722. For example, the action parser 738 may be configured to analyze the historical ticket data 722 and identify words within the ticket that are found in the dictionary 738 and then output those words as actions present within the tickets. It is noted that the action parser 950 of FIG. 9 may be the same as the action parser 724 and may use the dictionary 738 to perform action parsing operations during TAR generation.

The analytical module may also include a modelling engine 740. The modelling engine 740 may function in a manner that is similar to the modelling engine 450 of FIG. 4. For example, the modelling engine 740 may be configured to receive TARs (e.g., the stage 1 TAR 952 and the stage 2 TAR 954 of FIG. 9) as inputs and then fit each of the received TARs to one or more models. For example, a received stage 1 TAR may be fit to a stage 1 base model 742 and a stage 2 TAR may be fit to a stage 2 base model 744. Subsequently, model selection and hyperparameter tuning may be performed to produce a stage 1 tuned model 746 and a stage 2 tuned model 748. The stage 1 tuned model 746 and the stage 2 tuned model 748 may be provided to a prediction engine 768 of a live prediction module 760.

The prediction engine 768 may be configured to predict actions to mitigate or resolve predicted node failures associated with tickets based on the stage 1 tuned model 746 and the stage 2 tuned model 748. For example, the live prediction module 760 may include live data stream logic 762 configured to receive tickets via a live ticket data stream 726. The live ticket data stream 726 may include information associated with open tickets (i.e., tickets associated with node failures that are unresolved). The open tickets may be processed via data processing logic 764 in cooperation with a TAR generator 766 (e.g., the TAR generator described above with reference to FIG. 9) to generate TARs (e.g., a stage 1 TAR and a stage 2 TAR) that may be used to predict actions for resolving the node failure events associated with the open tickets. In an aspect, the data processing logic 764 may be configured perform data bucketing and identification of actions and the TAR generator 766 may be configured to combine at least portions of the bucketed data with the actions to produce the TARs. As described above with reference to FIG. 9, the TARs may include KPIs or other types of information derived from the live ticket stream 726 and prediction variables (e.g., the actions determined from the tickets). In an aspect, a portion of the KPIs or other types of information used to generate the TARs may include information received from the action parser 724 and/or a portion of the historical data 722.

The TARs generated by the TAR generator 766 may be provided to the prediction engine 768, which is configured with the tuned models 746, 748 produced by the modelling engine 740. The prediction engine 768 may evaluate the TARs against the stage 1 tuned model 746 and the stage 2 tuned model 748 to predict actions for mitigating the predicted failures that triggered generation of the tickets. In an aspect, the stage 1 tuned model 746 and the stage 2 tuned model 748 used by the prediction engine 768 to predict actions for the tickets may be classifiers.

Figure 10:
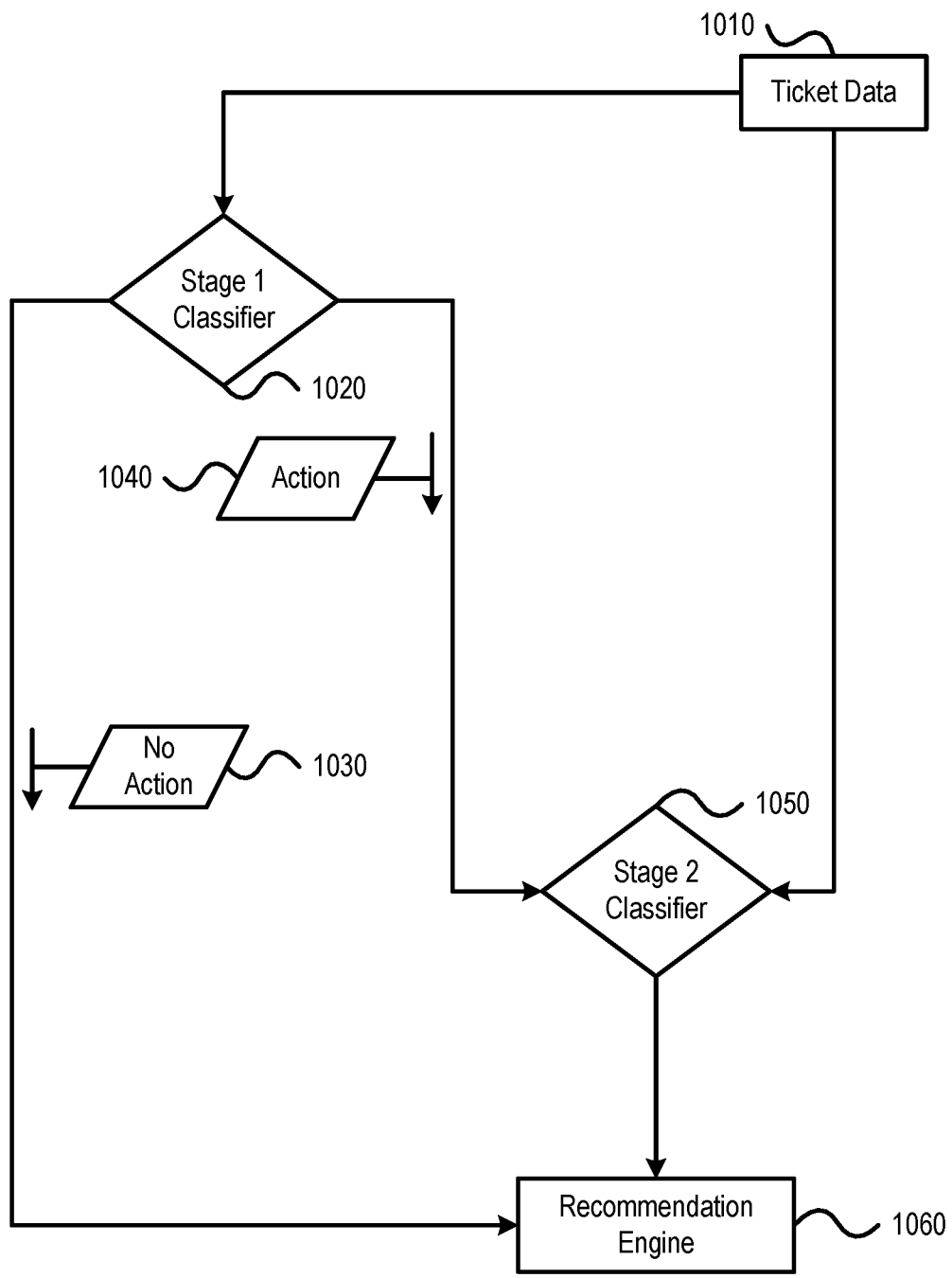
FIG. 10 shows a block diagram illustrating an exemplary process for using models to predict actions to mitigate failure events in accordance with aspects of the present disclosure.

To illustrate and referring to FIG. 10, a block diagram illustrating an exemplary process for using models to predict actions to mitigate failure events in accordance with aspects of the present disclosure is shown. In FIG. 10, a stage 1 classifier 1020 and a stage 2 classifier 1050 are shown. In an aspect, the stage 1 classifier 1020 may be the stage 1 tuned model 746 and the stage 2 classifier 1050 may be the stage 2 tuned model 748. The stage 1 classifier 1020 may configured to evaluate ticket data 1010 (e.g., TARs generated as described with reference to FIGS. 6, 7, and 9) and classify a ticket as a stage 1 ticket (i.e., a ticket that requires no action) or a stage 2 ticket (i.e., a ticket that requires action). As described above with reference to FIG. 9, the stage 1 classifier 1020 may have been trained using TARs created based on historical data. During the training, the stage 1 classifier 1020 may learn and identify patterns within the TARs that are indicative of tickets associated with stage 1 events (i.e., events that do not require action). It is noted that any tickets not classified as stage 1 events may be classified as stage 2 event (i.e., events that require action).

During live prediction (e.g., via the prediction engine of FIG. 7), the stage 1 classifier 1020 may evaluate TARs (e.g., stage 1 TARs) created from the live ticket feeds 726 and classify the tickets represented by the TARs. For example, TARs may include information associated with a ticket that is similar to information patterns indicative of stage 1 events (i.e., events that do not require action) identified during training. When a stage 1 event is detected, an incident associated with the ticket may be tagged, such as to tag the ticket with information that indicates that no action is required. The stage 1 classifier 1020 may be configured to classify any incidents related to tickets not identified as being associated with stage 1 events as tickets that require action and may tag those incidents with an action tag. The incidents associated with stage 1 events may be output as no action incidents 1030 and the incidents associated with non-stage 1 events may be output as action incidents 1040.

The stage 2 classifier 1050 may be configured to receive the action incidents 1040 and TARs (e.g., stage 2 TARs) created from the live ticket feeds 726. The stage 2 classifier may be configured to determine an action predicted to resolve or mitigate a failure event associated with each of the non-stage 1 tickets. The stage 2 classifier may be trained based on historic data (e.g., the historic data 722 of FIG. 7) and based on the training the stage 2 classifier 1050 may be able to recognize patterns with the received TARs and generate an action prediction based on the recognized patterns. It is noted that while the stage 1 classifier 1020 is described as providing for binary classification of incidents (e.g., requiring or not requiring action), the stage 2 classifier 1050 may be configured to provide for classification of many different actions for the identified incidents (or tickets) requiring action. As an illustrative example, the stage 2 classifier may include 32 different classes of actions that may be used to predict actions to address predicted failures events associated with the tickets represented by the TARs. Each of the 32 different classes may be associated with a particular pattern of TAR data, which may include data derived from multiple sources as described above with reference to FIG. 9. As the stage 2 classifier 1050 analyzes the TAR data, it may identify patterns within the TAR data corresponding to particular action classes and may predict the actions corresponding to the identified patterns for resolving or mitigating the failure events for which each ticket was generated.

It is noted that while the stage 2 classifier 1050 is described in the example above as including 32 different classes of actions, such description has been provided for purposes of illustration, rather than by way of limitation and that stage 2 classifiers in accordance with the present disclosure may include less than 32 classes or more than 32 classes. It is also noted that the particular number of classifications for each classifier may be configurable, such as to add additional classes (e.g., if new types of actions need to be added) or remove classes (e.g., if actions are no longer applicable due to changes in the configuration of the network or for other reasons). Moreover, it is to be appreciated that while the modelling techniques described herein discuss the use of 2 classifiers, such description has been provided for purposes of illustration, rather than by way of limitation and that fault mitigation devices and systems operating in accordance with embodiments of the present disclosure may utilize more than two classifiers or may use modelling techniques other than classifier to predict actions.

During classification, the stage 2 classifier 1050 may be configured to assign confidence scores to the predicted actions. The confidence scores may be assigned in a manner similar to the confidence scores described above with respect to the failure prediction logic 466 of FIG. 4. For example, confidence scores for predicted actions may be determined based on a degree of similarity between TAR data associated with a ticket and an identifiable pattern of TAR data corresponding to an action as determined during training of the classifier. Actions predicted based on TAR data that share high degree of similarity with an identifiable pattern may be assigned higher confidence scores than actions predicted based on TAR data that shares lesser degree of similarity with an identifiable pattern. In an aspect, the confidence scores may also be based on the action incidents 1040 received from the stage 1 classifier. For example, a ticket associated with an incident identified in the action incidents 1040 should be identified by the stage 2 classifier as requiring an action. If the stage 2 classifier 1050 does not find TAR data for that ticket to be sufficiently similar to one of the identifiable patterns associated with the 32 different actions, a confidence score may be predicted for the ticket, but the confidence score may be lower than tickets associated with TAR data that shares more similarities with one of the identifiable patterns.

A recommendation engine 1060 may receive the no action incidents 1030 and the predicted actions generated by the stage 2 classifier and may provide the data to an orchestration module for further processing. For example, and referring back to FIG. 3, the outputs of the analytical module 320 (e.g., the predicted actions generated by the stage 2 classifier 1050 of FIG. 10 and the no action incidents 1030 of FIG. 10) may be received at the ticket orchestration module 330. The ticket orchestration module 330 may be configured to channelize or route the prediction actions to different destinations for further processing. In an aspect, the ticket orchestration module 330 may be configured to utilize the confidence scores associated with each predicted action to perform orchestration.

Figure 11:
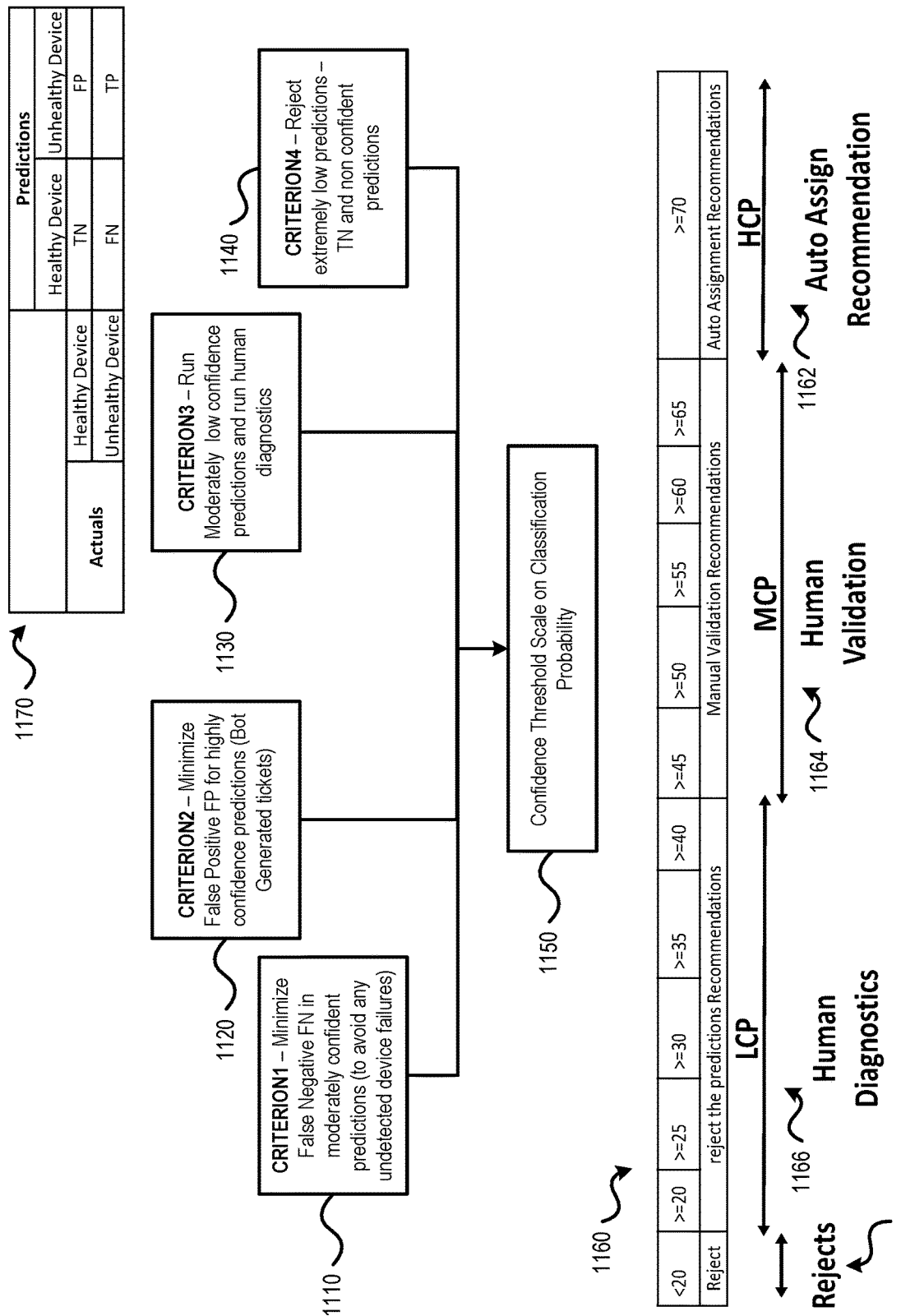
FIG. 11 shows a block diagram illustrating an exemplary conceptual framework for performing ticket orchestration in accordance with aspects of the present disclosure.

Referring briefly to FIG. 11, a block diagram illustrating an exemplary conceptual framework for performing ticket orchestration in accordance with aspects of the present disclosure is shown. In an aspect, the conceptual framework and functionality described with respect to FIG. 11 may be provided by an orchestration module (e.g., the orchestration module 330 of FIG. 3). As shown in FIG. 11, the conceptual orchestration framework may be based on a set of criteria 1110, 1120, 1130, 1140 outlining principles or goals that should be achieved via the use of confidence scores and thresholds associated with action predictions during orchestration. The criterion 1110 indicates that FN predictions should be minimized in the calculated confidence scores and the criterion 1120 indicates that FP predictions should be minimized in the calculated confidence scores. Minimizing FN action predictions may help avoid taking actions that will not resolve a root cause of a predicted failure associated with a ticket and minimizing FP predictions may help reduce unnecessary tasks, such as performing unnecessary actions for healthy nodes. The criterion 1130 indicates that predictions having a moderately low (e.g., based on a particular range on the scale described below) confidence scores may be candidates for diagnostic analysis (e.g., via the validation module 340 of FIG. 3) and the criterion 1140 indicates that predictions having very low confidence scores should be rejected (i.e., no action taken).

Table 1170 illustrates that FN action predictions may occur when no action is predicted (i.e., no action incidents) and the actual state of the node is unhealthy (i.e., exhibiting signs of failure or has failed). Table 1170 also illustrates that FP predictions may occur when an action is predicted for resolving a failure but the node associated with the failure is actually healthy (i.e., has not failed and exhibits no signs of failure). Table 1170 also shows that a true negative TN prediction may occur when no action is predicted for a healthy node (i.e., has not failed and exhibits no signs of failure), and that TP predictions may occur when an action is predicted to resolve a failure associated with a ticket and the action actually resolves the failure. It is to be appreciated that minimizing FN and FP failure predictions may result in a higher occurrence of TP and TN predictions, which may improve the overall efficiency of the system with respect to resolving failures associated with tickets. For example, TP predictions may require less diagnostic testing and validation in some cases (e.g., well-known failures, failures that may be corrected automatically, etc.) and because the predicted actions actually address the causes of the tickets (e.g., node failures) and TN predictions may represent actual healthy nodes and no action may need to be taken (e.g., tickets associated with the no action incidents 1030 of FIG. 10). It is noted that the FN and FP predictions may occur due to classification capabilities of the model used to generate action predictions and the confidence scores. For example, a ticket represented by the TAR data may exhibit a small number of KPIs or characteristics that are similar to a historic ticket action patterns and due to those similarities an action may be predicted. The predicted action however, may be an FP prediction caused by the small number of KPIs or characteristics that match or are similar to the historic ticket pattern. Additionally, the confidence score assigned to the action prediction for the ticket in this example may be low due to the small number of KPIs or characteristics that match or are similar to the historic failure pattern. It is noted that FN predictions may also occur under similar circumstances or for other reasons. Over time the number of FN predictions and FP predictions may be reduced through improved training and tuning of the model(s) used to perform live action predictions for tickets.

The principles provided by the criteria 1110, 1120, 1130, 1140 and the concepts described with reference to the Table 1170 may be used to construct a confidence threshold scale 1150 that may be used to determine how predicted failures are handled by the orchestration module (e.g., the orchestration module 330 of FIG. 3). An exemplary confidence threshold 1160 is shown in FIG. 11 and includes a HCP range 1162, a moderate confidence prediction (MCP) range 1164, and a low confidence prediction (LCP) range 1166. The HCP range 1162 may include confidence scores having values between 70 and 100, the MCP range 1164 may include confidence scores having values between 45 and less than 70, and the LCP range 1166 may include confidence scores having values between 20 and less than 45. Failure predictions associated with confidence scores below the LCP range 1166 may fall into a RCP range 1168. It is noted that the exemplary confidence threshold scale 1160 has been provided for purposes of illustration, rather than by way of limitation and that confidence threshold scales in accordance with the present disclosure may include more than 4 ranges or less than 4 ranges, and may also include range values other than those explicitly shown in FIG. 11 (e.g., an HCP range may be defined to include confidence scores between 90 and 100, an MCP range may be defined to include values other than between 45 and less than 70, and the like).

The confidence threshold scale 1150 (or exemplary scale 1160) may be used by the orchestration module of a ticket analysis module (e.g., the ticket analysis module 150 of FIG. 1) to route action predictions for further processing. For example, action predictions associated with confidence scores within the HCP range 1162 may be routed to a ticket assignment module (e.g., the ticket assignment module 360 of FIG. 3) that automatically assigns tickets (e.g., as shown at arrow 304 of FIG. 3) to a user (e.g., a network technician, IT personnel, etc.) that may perform the action. It is noted that in some instances the actions may not be assigned to a user and instead may be assigned for automated execution by a software agent or an action execution device configured to execute predicted actions without human intervention. To illustrate, an action that simply requires a node of the network to be rebooted may not require a user to be performed and the ticket may be assigned to the software agent or the action execution device that may then transmit instructions or commands to the node. Upon receiving the instructions or commands, the node may be rebooted and the action may be completed. Action predictions associated with confidence scores within the MCP range 1162 may be routed to a validation module (e.g., the ticket validation module 340 of FIG. 2) where the predicted action may be further analyzed and validated prior to ticket assignment (e.g., via the ticket assignment module 360 of FIG. 3). Action predictions associated with confidence scores within the LCP range 1166 may be routed to a validation module (e.g., the ticket diagnostic module 350 of FIG. 3) where the predicted action may be further analyzed via manual or automated diagnostic testing or other processes prior to ticket creation (e.g., via the ticket creation module 260 of FIG. 2). Action predictions associated with confidence scores within the RCP range 1168 may be rejected (i.e., no further analysis or processing may be performed) and tickets associated with the rejections may be closed.

Utilizing the confidence scale ranges to orchestrate or channelize action predictions for further processing and/or ticket assignment may improve the overall efficiency of a fault mitigation device (e.g., the fault mitigation device 110 of FIG. 1). For example, utilizing automated ticket assignment for action predictions having high confidence scores may streamline assignment of tickets associated with actions having a high likelihood of actually resolving the failures for which the tickets were generated and may reduce the number of tickets that are assigned with FN and FP action predictions. Additionally, performing additional diagnostics and analysis of action predictions associated with confidence scores within the MCP range 1164 and LCP range 1166 may enable action predictions to be vetted to evaluate the validity of those predicted actions prior to assigning tickets to a user. The additional vetting of those action predictions via diagnostics and other validation procedures may enable FN and FP action predictions to be weeded out and prevent a technician from spending time addressing non-existent failure conditions or performing actions that may not actually resolve the failure conditions. It is noted that tickets may be assigned for any action predictions that survive the additional vetting procedures and those tickets may be more likely to be associated with actions that address actual failure events. Moreover, discarding failure predictions that fall within the RCP range 1168 may prevent resources (e.g., diagnostic resources, personnel resources, etc.) used to perform the vetting of failure predictions from being allocated to investigating predicted actions that have a high likelihood of not resolving actual failures.

Referring back to FIG. 3, the orchestration module 330 may be configured to perform orchestration of ticket and action predictions, which in some embodiments may be based on confidence scores as described above with reference to FIG. 11. Ticket and action prediction orchestration may include routing outputs of the analytical module 320 (e.g., tickets and their associated action predictions or no action designations) for further processing by the ticket analysis module 340, the ticket diagnostic module 350, or the ticket assignment module 360. As described above with reference to FIG. 11, the ticket analysis module 340 and the ticket diagnostic module 350 may be configured to evaluate predicted actions, such as to validate that the action is known to resolve a failure identified in a ticket corresponding to the predicted action, performing diagnostics on a node, or other validation operations associated with the predicted action and/or the ticket corresponding to the predicted action. For example, the ticket diagnostic module 350 may be configured to perform diagnostics on the network nodes (e.g., the nodes 172, 174, 176 of FIG. 1) to detect the presence of a potential or actual failure condition at a node associated with the predicted action, and the ticket analysis module 340 may be configured to present information associated with a predicted action and/or the ticket corresponding to the predicted action to a user (e.g., a network technician or IT personnel operating one of the user device(s) 190 of FIG. 1) for analysis. In some aspects, the validation and diagnostic operations of the ticket analysis module 340 and the ticket diagnostic module 350 may include transmitting the ticket to another user (e.g., a field technician or network repair personnel), as indicated by arrow 306, who may inspect the node, perform the predicted action, confirm the presence of a failure event or conditions indicating a failure event is likely to occur, diagnose a root cause of the failure, determine additional actions to be performed (e.g., if the predicted action did not resolve the failure), or other types of validation and diagnostic operations.

During the validation and diagnostic operations the ticket may be updated, such as to provide notes written in natural language by a field technician while processing the ticket. Once the ticket is resolved, the notes and other information added to the ticket may be transmitted to a ticket management module (e.g., the ticket management module 140 of FIG. 1). It is noted that the action miner and the natural language processing provided by the action miner may enhance the learning capabilities of fault mitigation devices and systems operating in accordance with the concepts described herein. For example, the notes provided by the users (e.g., field technicians, IT personnel, etc.) may provide information that indicates certain actions do not resolve certain types of failure events, confirm that certain actions resolve other types of failure events, or other information associated with actions taken to resolve failure events of a network. The action miner may extract information from the notes that enables the models to be trained and tuned to more accurately predict actions that resolve or mitigate failure events.

Figure 8:
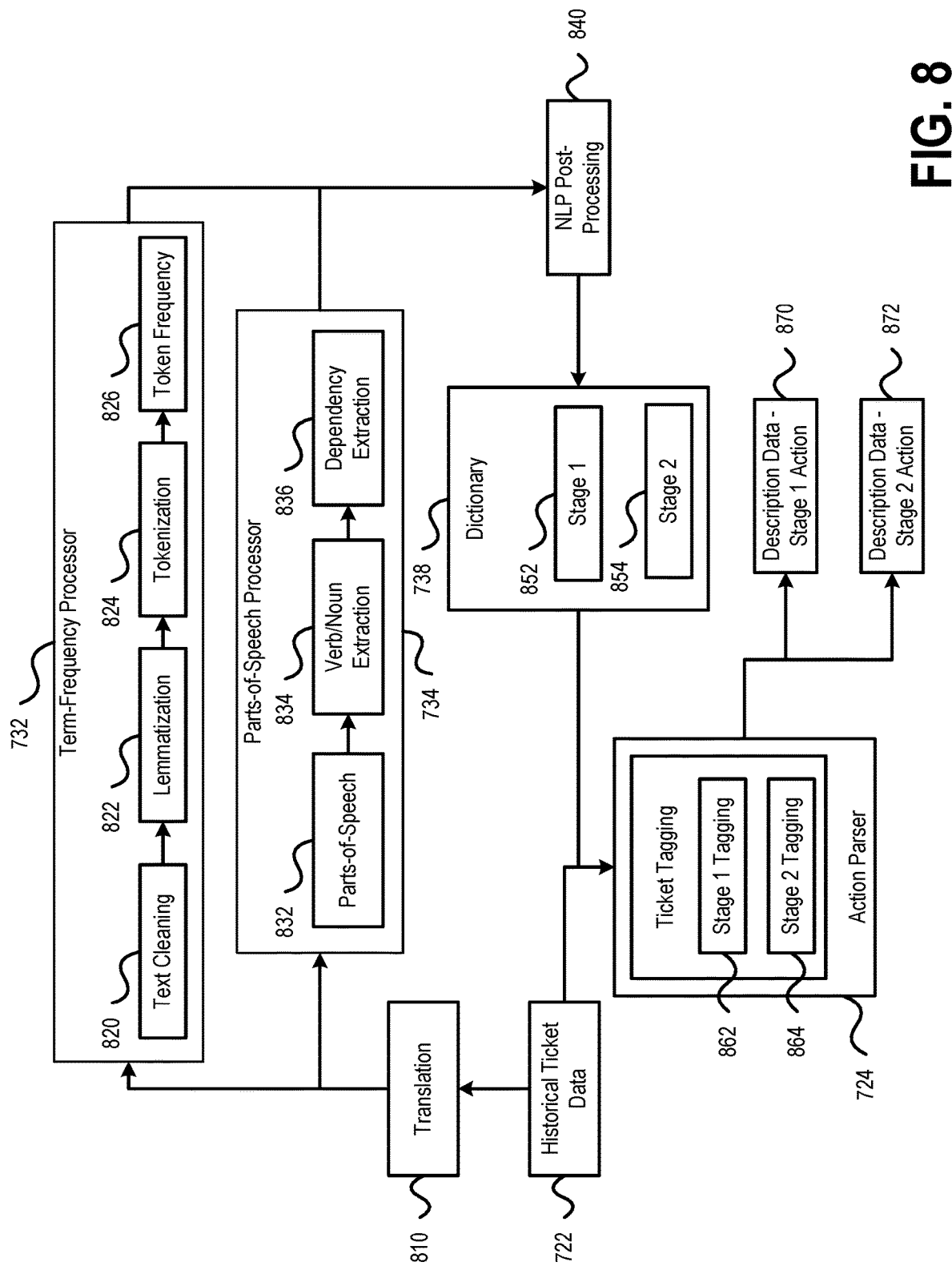
FIG. 8 shows a block diagram illustrating aspects of mining action information from tickets associated with network failures in accordance with the present disclosure.

For example, and referring to FIG. 8, a block diagram illustrating aspects of mining action information from tickets associated with network failures in accordance with the present disclosure is shown. In an aspect, the operations described with respect to FIG. 8 may be performed by the action miner 702 of FIG. 7. As shown in FIG. 8, the action miner includes the term processor 732, the speech processor 734, the dictionary 738, translation logic 810, and post processing logic 840. In an aspect, the functionality described with reference to the translation logic 810 may be provided by the NLP engine 730 of FIG. 7.

The term processor 732 may receive historic ticket data 722. Upon receiving the historic ticket data 722, the NLP engine 730 may analyze tickets included in the historic ticket data 722 to determine whether information included in any of the tickets is in a non-compatible language. For example, the term processor 732 may be configured to analyze ticket data using a single language (e.g., English), which may allow for consistent identification of information of interest, as will become apparent in the description below. If any of the tickets include information in the non-compatible language, the NLP engine 730 may provide those tickets to the translation logic 810 for translation. The translation logic 810 may be configured with a language library that allows the translation logic 810 to translate the ticket data from the non-compatible language to the language designated for use by the term processor 732. Alternatively or additionally, the translation logic 810 may utilize one or more translation services provided by third parties (e.g., Google Translate, etc.) to translate the ticket data to the correct language. It is noted that some third party translation services may be machine-translations, which may be less accurate than a human translation, but the machine-translations provide sufficiently accurate information to facilitate operations of the term processor 732.

Once the historic ticket data 722 is in the appropriate language, it may be provided to the term processor 732 and the speech processor 734. As shown in FIG. 8, the term processor 732 may include text cleaning logic 820, lemmatization logic 822, tokenization logic 824, and token frequency logic 826. The text cleaning logic 820 may remove hypertext markup language (HTML) tags, stop words (e.g., "a", "an", "the", etc.), punctuation marks (e.g., periods, commas, semi-colons, etc.), white spaces, uniform resource locators (URLs), and the like from the tickets. The lemmatization logic 822 may be configured to perform stemming (e.g., removing suffixes from words, such as to remove "ing", "ed", or other suffixes from words present in the tickets), sentence segmentation (e.g., dividing the text of the tickets into component sentences, etc.). The tokenization logic may be configured to break the text of the tickets into individual words and each individual word may represent a token. Additionally, certain elements of the text data may be treated as special token elements, such as white spaces, and these additional token elements may be handled differently than tokens associated with words within the text data, such as by removing white space tokens during the sentence segmentation process. The token frequency logic 826 may be configured to create a count for each token, such as to indicate that a first token appeared 10 times in the ticket, a second token appeared 2 times in the ticket, and so on. The term processor 732 may output a set of ticket features based on the operations performed by the text cleaning logic 820, the lemmatization logic 822, the tokenization logic 824, and the token frequency logic 826. For example, the set of ticket features may include the tokens generated by the tokenization logic 824 and the token frequency counts determined by the token frequency logic 826. It is noted that the exemplary operations and functionality of the term processor 732 described above has been provided for purposes of illustration, rather than by way of limitation and that term processors in accordance with the present disclosure may utilize additional data processing techniques to generate the set of ticket features.

As shown in FIG. 8, the speech processor 734 may include speech logic 832, verb/noun extraction logic 834, and dependency extraction logic 836. Unlike the term processor 732, which primarily seeks to identify meaningful portions of the text (i.e., the tokens and the frequencies), the speech processor 734 may seek to find relationships between different portions of the ticket text. The speech logic 832 may be configured to identify parts of speech, such as syllables, within the ticket text. The verb/noun extraction logic 834 may be configured to identify verbs and nouns present with the ticket text based on the parts of speech identified by the speech logic 832. The dependency extraction logic 836 may be configured to identify dependencies or relationships between the verbs and nouns identified by the verb/noun extraction logic 834. To illustrate, the verb/noun extraction logic 834 may identify the verbs within the ticket text (e.g., repair, replace, update, configure, reboot, disconnect, and the like) and nouns within the ticket text (e.g., DSLAM, software, sensor, hard drive, memory, and the like). The dependency extraction logic 836 may be configured to identify verb-noun pairs that may associate one of the identified verbs to one of the identified nouns (e.g., reboot-DSLAM, update-software, replace-sensor, etc.). The dependencies or relationships identified by the dependency extraction logic 836 may provide insights into actions that may be taken with respect to different types of nodes or failure events associated with a network (e.g., the one or more networks 170 of FIG. 1).

The output of the term processor 732 (e.g., the tokens and token frequencies) and the output of the speech processor 734 (e.g., the verb-noun dependencies) may be combined by post-processing logic 840. In an aspect, the post-processing logic 840 may include the override logic 736 of FIG. 7. The post-processing logic 840 may perform various operations to organize and clean up the tokens, token frequencies, and the verb-noun dependencies prior to generating the dictionary 738. For example, override logic may allow a user to review the tokens, token frequencies, and the verb-noun dependencies and manually remove some of the data, such as tokens or verb-noun dependencies that are not relevant to fault mitigation operations. Additionally, the post-processing logic 840 may be configured to collate the tokens, token frequencies, and the verb-noun dependencies. To illustrate, tokens and token frequencies may be arranged in a particular order (e.g., highest frequency to lowest frequency, lowest frequency to highest frequency, etc.), portions of the tokens, token frequencies, and/or the verb-noun dependencies may be combined, such as to associate certain verb-noun dependencies with particular tokens (e.g., associate a token related to a specific type of node or failure to a verb-noun dependency that is also related to the specific type of node or failure), or other types of operations. It is noted that the above described operations may be performed periodically, which may result in new tokens, token frequencies, and/or verb-noun dependencies being identified.

After post-processing operations are completed, the dictionary 738 may be created (or updated). As described above, the dictionary 738 may include information that may enable actions to be determined based on raw ticket data. In an aspect, the dictionary 738 may include a stage 1 dictionary 852 and a stage 2 dictionary 854. The stage 1 dictionary 852 may be used to tag tickets that require action and tickets that do not require any further action, as described above. The stage 2 dictionary 854 may be used to tag tickets that require action with a particular action recommendation or category, as described above.

The action parser 724 may be configured to tag the ticket records based on the dictionary 738. For example, the action parser may be configured to analyze tickets (e.g., the historical ticket data 722 or live ticket data) using fuzzy logic and the dictionary 738 to apply tags to the tickets. The fuzzy logic may calculate distances (e.g., Levenshtein distances, Winkler distances, etc.) between words within the tickets to identify sequences of words that are correlated to or match the dictionary 738. In an aspect, the action parser 724 may include stage 1 tagging logic 862 and stage 2 tagging logic 864. The stage 1 tagging logic 862 may be configured to use fuzzy logic to perform tagging based on the stage 1 dictionary 852 and the stage 2 tagging logic 864 may be configured to use fuzzy logic to perform tagging based on the stage 2 dictionary 854. The tickets, once tagged by the fuzzy logic, may be stored at a ticket management module (e.g., the ticket management module 140 of FIG. 1) as tagged tickets 870, 872. The tagged tickets 870 may correspond to tickets tagged based on the stage 1 dictionary 852 and the stage 1 tagging logic 862, and the tagged tickets 872 may correspond to tickets tagged based on the stage 2 dictionary 854 and the stage 2 tagging logic 864.

Figure 12:
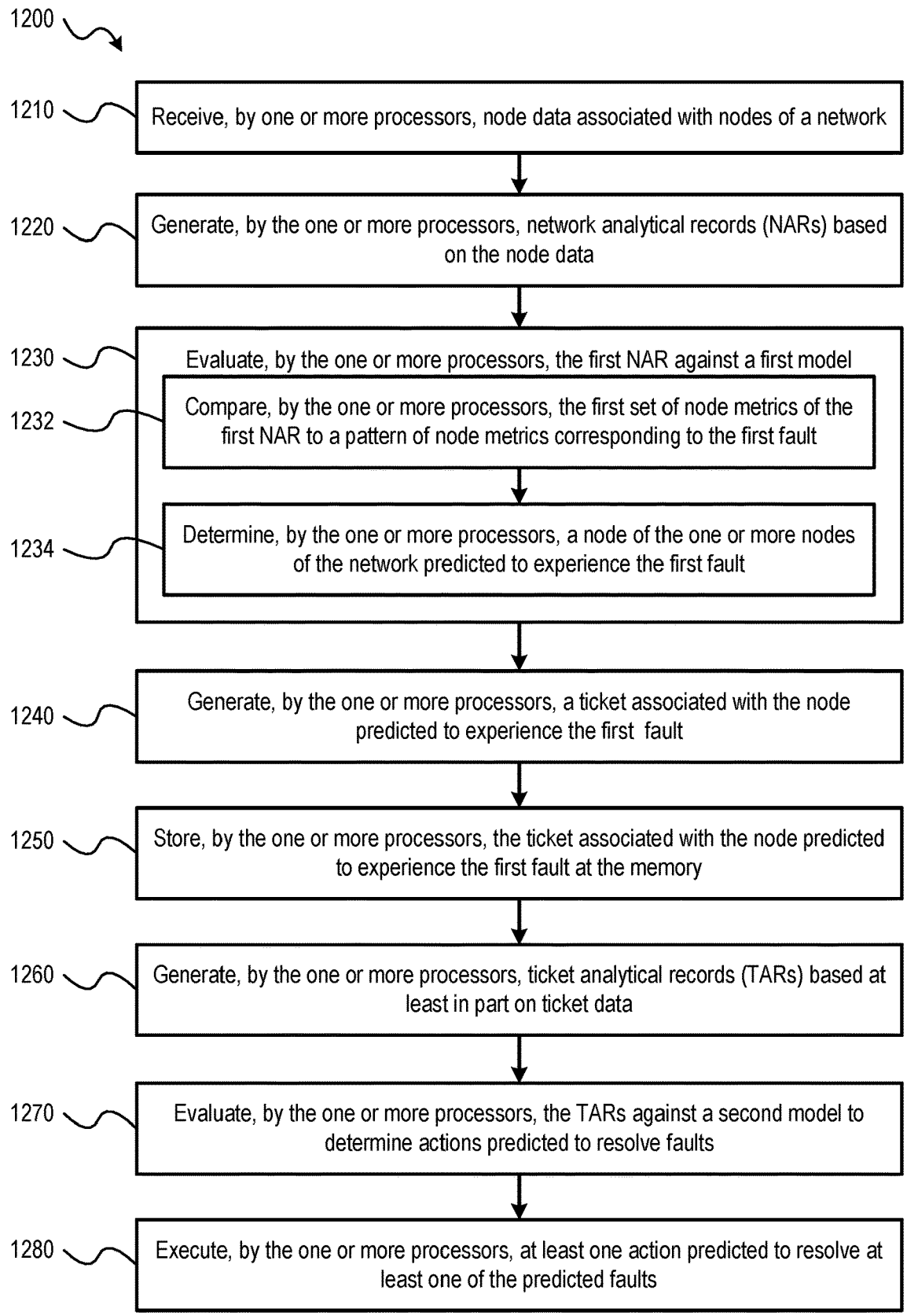
FIG. 12 shows a flow diagram of an exemplary method for predicting and mitigating faults of network nodes in accordance with aspects of the present disclosure according to embodiments of the present invention.

Referring to FIG. 12, a flow diagram of an exemplary method for predicting and mitigating faults of nodes of a network in accordance with aspects of the present disclosure is shown as a method 1200. In an aspect, the method 1200 may be performed by a system, such as the system 100 of FIG. 1. Steps of the method 1200 may be stored as instructions (e.g., the instructions 122 of FIG. 1) that, when executed by one or more processors (e.g., the one or more processors 112 of FIG. 1), cause the one or more processors to perform operations for predicting and mitigating faults of network nodes in accordance with aspects of the present disclosure.

At step 1210, the method 1200 includes receiving, by one or more processors, node data associated with nodes of the network. In an aspect, the node data may include at least performance data for the nodes of the network and alarm data associated with nodes of the network. As described above with reference to the network analysis module 130 of FIG. 1, the node data may also include troubled tickets data and disconnection data. At step 1220, the method 1200 includes generating, by the one or more processors, NARs based on the node data. As described above, the NARs may include node metrics associated with one or more nodes of the network and information associated with a first fault. In an aspect, generation of the NARs may include generating backward rolling data based on the node data, generating forward rolling data based on the node data, and merging the backward rolling data and forward rolling data to produce the NARs, as described above with reference to FIG. 5. In an aspect, the node metrics for each of the NARs may be derived from the backward rolling data and the fault for each of the NARs may be determined based on the forward rolling metrics.

At step 1230, the method 1200 includes evaluating, by the one or more processors, the NARs against a first model. In an aspect, the first model may be the tuned model 454 of FIG. 4. In an aspect, evaluating the NARs against the first model may include, at 1232, comparing the node metrics of the NARs to a pattern of node metrics corresponding to the first fault (or a pattern corresponding to another fault) and at 1234, determining a node of the one or more of the nodes of the network predicted to experience the first fault. As described above, the node predicted to experience the first fault may be identified or determined based on whether a portion of the node metrics corresponding to the node exhibit the pattern of node metrics corresponding to the first fault.

At step 1240, the method 1200 include generating a ticket associated with the node predicted to experience the fault. It is noted that various processes may be performed in connection with and prior to generating the ticket, such as orchestration, validation, and diagnostic testing, as described above with reference to FIGS. 4 and 6. At step 1250, the method 1200 includes storing, by the one or more processors, the ticket associated with the node predicted to experience the first fault at a memory. In an aspect, the memory may be the memory 120 of FIG. 1 and the ticket may be stored at a ticket database of a ticket management module or system.

At step 1260, the method 1200 includes generating, by the one or more processors, ticket analytical records (TARs) based at least in part on ticket data. As described above, the ticket data may include tickets associated with faults predicted by the first model. Each of the TARs may include a set of ticket metrics (e.g., the ticket metadata with or without device metadata) associated with the tickets, or other types of information, such as the information described above with reference to FIG. 9. Additionally, each of the TARs may include information associated with self-healing tickets or non-self-healing tickets. For example, as described above with reference to FIG. 9, stage 1 TARs may not require any actions to be performed and may be considered self-healing (i.e., because either there is not a fault or failure to address or the fault or failure will be automatically resolved). The information associated with self-healing tickets may be determined based on parsing of log data, as described with reference to FIG. 9. Additionally, stage 2 TARs may require an action to be performed to resolve the fault or failure and may be considered non-self-healing (i.e., because the fault or failure will not be resolved automatically). The information associated with non-self-healing tickets may be determined based on parsing of log data, as described with reference to FIG. 9.

At step 1270, the method 1200 may include evaluating, by the one or more processors, the TARs against a second model. The second model may be configured to identify self-healing tickets within tickets and non-self-healable tickets within the tickets (e.g., as described above with respect to the stage 1 classifier 1020 of FIG. 10). The second model may also be configured to determine, for each of the non-self-healable tickets, actions predicted to resolve faults corresponding to each of the non-self-healable tickets (e.g., as described above with respect to the stage 2 classifier 1050 of FIG. 10).

At step 1280, the method 1280 includes executing, by the one or more processors, at least one action predicted to resolve at least one of the faults corresponding to at least one the non-self-healable tickets. In an aspect, the at least one action may be executed automatically and without human intervention, as described above. It is noted that the tickets may be updated to include information indicating the predicted actions and once updated, those tickets may be provided to an orchestration module (e.g., the orchestration module 330 of FIG. 3). The orchestration module may be configured to route the ticket for further processing, such as for automated execution, manual execution, diagnostic evaluation, or validation processing, as described above with reference to FIG. 3. It is noted that the method 1200 may include functionality, such as functionality for creating dictionaries, mining action data from historical tickets, tagging of tickets or other operations described in more detail above with reference to FIGS. 1-11.

It is to be appreciated that the method 1200 may and the embodiments illustrated and described with reference to FIGS. 1-11 may provide several improvements and advantages with respect to monitoring, detecting, and addressing failures or faults in network systems. For example, the ability to predict network device failures may enable pre-emptive maintenance to be performed, which may reduce the number of failures that actually occur within a network and may also limit the impact of failures that do occur. This may improve the uptime of the network devices or nodes, as well as the services that those devices support via the network. Additionally, embodiments of the present disclosure may improve over time (e.g., by training and updating the models as more node data and ticket data become available). The ability of the disclosed modelling techniques to learn alarm patterns and data patterns through analysis of the historical node and ticket data may help improve the capabilities of the models to more accurately predict failure events and actions to address predicted failure events. This may help prevent network outages, reduce and plan the turn-around-time for any outage, improve efficiency of field technicians (e.g., by providing more accurate action recommendations), and meet or exceed any uptime or service guarantees with customers. It is also noted that the failure prediction techniques and action prediction techniques disclosed herein may be readily applied to many different types of networks. For example, the disclosed embodiments may be utilized to monitor voice networks (e.g., 4G/LTE, 5G, or other cellular networks, voice over IP (VoIP) networks, etc.), geographically distributed networks, Internet of Things (IoT) networks, Internet service provider infrastructure, or other types of systems that rely interconnection of many devices.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for predicting and mitigating faults of network nodes, the method comprising:
  receiving, by one or more processors, node data associated with nodes of a network, wherein the node data comprises at least performance data for each of the nodes of the network and alarm data associated with nodes of the network;
  generating, by the one or more processors, network analytical record (NARs) based on the node data, wherein the NARs comprise node metrics associated with one or more nodes of the network and information associated with a first fault;
  evaluating, by the one or more processors, the NARs against a model configured to:
    compare the node metrics of the NARs to a pattern of node metrics corresponding to the first fault; and
    determine a node of the one or more nodes of the network predicted to experience the first fault based on whether a portion of the node metrics corresponding to the node exhibit the pattern of node metrics corresponding to the first fault;
  generating, by the one or more processors, a ticket associated with the node predicted to experience the first fault;
  storing the ticket associated with the node predicted to experience the first fault at a ticket management system;
  generating ticket analytical records (TARs) based at least in part on ticket data, the ticket data including tickets associated with faults predicted by the model, wherein each of the TARs includes a set of ticket metrics associated with the tickets;
  evaluating, by the one or more processors, the TARs against a second model configured to:
    identify self-healing tickets within tickets and non-self-healable tickets within the tickets; and
    determine, for each of the non-self-healable tickets, actions predicted to resolve faults corresponding to each of the non-self-healable tickets; and
  executing, by the one or more processors, at least one action predicted to resolve at least one of the faults corresponding to at least one the non-self-healable tickets.

2. The method of claim 1, wherein generating the NARs comprises:
  generating backward rolling data based on the node data;
  generating forward rolling data based on the node data; and
  merging the backward rolling data and forward rolling data to produce a first NAR, wherein the node metrics of the NARs are derived from the backward rolling data and the first fault is determined based on a forward rolling metrics.

3. The method of claim 2, wherein the alarm data comprises information associated with status alarms and information associated with failure alarms, and wherein the backward rolling data is generated based on the failure alarms.

4. The method of claim 3, wherein the node data further comprises troubled ticket data and device disconnection data, and wherein the backward rolling data is generated based on the performance data, the status alarms, the troubled ticket data, and the device disconnection data.

5. The method of claim 1, further comprising:
generating historic NARs based on historical data;
fitting a base model to the historic NARs;
tuning characteristics of the base model based on the fitting to produce the model; and
providing the model to a fault prediction engine configured to predict faults within the network.

6. The method of claim 1, wherein the second model is a multistage classification model that includes a first classifier and a second classifier, wherein identifying the self-healing tickets and the non-self-healing tickets is based on evaluation of a first TAR against the first classifier, and determining the actions predicted to resolve the faults corresponding to each of the non-self-healable tickets is based on an evaluation of the non-self-healable tickets associated with the first TAR against the second classifier.

7. The method of claim 1, further comprising:
determining confidence scores for the actions predicted to resolve faults corresponding to each of the non-self-healable tickets, wherein each of the confidence scores indicates a likelihood that a predicted action will resolve the fault of the corresponding non-self-healable ticket; and
determining to assign the at least one ticket for execution or investigation based on the confidence score.

8. The method of claim 1, further comprising:
constructing an action dictionary based at least in part on historical ticket data;
tagging historical tickets included in the historical ticket data with one or more tags derived from the action dictionary; and
training the second model based on the tagged historical ticket data.

9. The method of claim 8, wherein the ticket data comprises metadata, ticket update data, and troubled tickets data, and wherein generating a first TAR comprises:
extracting log data from the ticket update data and the troubled tickets data;
extracting action data from the log data based on the action dictionary;
generating bucketed data based on the metadata, the ticket update data, and the troubled tickets data, wherein the bucketed data comprises: bucketed metadata derived from the metadata; bucketed log data derived from the ticket update data and the troubled tickets data; and bucketed failure data derived from the troubled tickets data, the ticket update data, and the metadata; and
aggregating the bucketed data and a portion of the action data to produce the first TAR, wherein a second TAR comprises the bucketed data of the first TAR and a different portion of the action data.

10. A non-transitory computer-readable medium storing instructions that, when executed by one or more processors, cause the one or more processors to perform operations for predicting and mitigating faults of network nodes, the operations comprising:
receiving node data associated with nodes of a network, wherein the node data comprises at least performance data for each of the nodes of the network and alarm data associated with nodes of the network;
generating network analytical records (NARs) based on the node data, wherein a first NAR of the NARs comprises a first set of node metrics associated with one or more nodes of the network and information associated with a first fault;
evaluating the first NAR against a model configured to:
compare the first set of node metrics of the first NAR to a pattern of node metrics corresponding to the first fault; and
determine a node of the one or more nodes of the network predicted to experience the first fault based on whether a portion of the first set of node metrics corresponding to the node exhibit the pattern of node metrics corresponding to the first fault;
generating a ticket associated with the node predicted to experience the first fault;
storing the ticket associated with the node predicted to experience the first fault at a ticket management system;
generating ticket analytical records (TARs) based at least in part on ticket data, the ticket data including tickets associated with faults predicted by the model, wherein each of the TARs includes include ticket metrics derived, at least in part, on the tickets;
evaluating, by the one or more processors, the TARs against a second model configured to:
identify self-healing tickets within the tickets and non-self-healable tickets within the tickets; and
determine, for each of the non-self-healable tickets, actions predicted to resolve faults corresponding to each of the non-self-healable tickets; and
executing, by the one or more processors, at least one action predicted to resolve at least one of the faults corresponding to at least one the non-self-healable tickets.

11. The non-transitory computer-readable medium of claim 10, wherein the alarm data comprises information associated with status alarms and information associated with failure alarms, wherein the node data further comprises troubled ticket data and device disconnection data, and wherein generating the first NAR comprises:
generating backward rolling data based on the node data, wherein the backward rolling data is generated based on the performance data, the status alarms, the troubled ticket data, and the device disconnection data;
generating forward rolling data based on the node data, and wherein the backward rolling data is generated based on the failure alarms; and
merging the backward rolling data and forward rolling data to produce the first NAR, wherein the first set of node metrics are derived from the backward rolling data, and wherein the information associated with the first fault is determined based on a forward rolling metrics.

12. The non-transitory computer-readable medium of claim 11, wherein the NARs comprise a second NAR generated based on the merging of the backward rolling data and the forward rolling data.

13. The non-transitory computer-readable medium of claim 10, wherein the second model is a multistage classification model that includes a first classifier and a second classifier, wherein the self-healing tickets are identified during a first stage of the multistage classification model and the non-self-healing tickets are identified during a second stage of the multistage classification model, wherein the first classifier is associated with the first stage and the second classifier is associated with the second stage, and wherein the second classifier is configured to determine the actions predicted to resolve the faults corresponding to each of the non-self-healable tickets.

14. The non-transitory computer-readable medium of claim 10, further comprising:

determining confidence scores for the actions predicted to resolve faults corresponding to each of the non-self-healable tickets, wherein each of the confidence scores indicates a likelihood that a predicted action will resolve the fault of the corresponding non-self-healable ticket; and determining to assign the at least one ticket for execution or investigation based on the confidence score.

15. The non-transitory computer-readable medium of claim 10, further comprising:

constructing an action dictionary based at least in part on historical ticket data;

tagging historical tickets included in the historical ticket data with one or more tags derived from the action dictionary; and training the second model based on the tagged historical ticket data.

16. The non-transitory computer-readable medium of claim 15, wherein the ticket data comprises metadata, ticket update data, and troubled tickets data, and wherein generating a first TAR comprises:

extracting log data from the ticket update data and the troubled tickets data;

extracting action data from the log data based on the action dictionary;

generating bucketed data based on the metadata, the ticket update data, and the troubled tickets data, wherein the bucketed data comprises: bucketed metadata derived from the metadata; bucketed log data derived from the ticket update data and the troubled tickets data; and bucketed failure data derived from the troubled tickets data, the ticket update data, and the metadata; and aggregating the bucketed data and a portion of the action data to produce the first TAR, wherein a second TAR comprises the bucketed data of the first TAR and a different portion of the action data.

17. A system comprising:

a memory configured to store tickets associated with faults predicted to occur within a network; and one or more processors configured to:

receive node data associated with nodes of the network, wherein the node data comprises at least performance data for each of the nodes of the network and alarm data associated with nodes of the network;

generate network analytical records (NARs) based on the node data, wherein a first NAR of the NARs comprises a first set of node metrics associated with one or more nodes of the network and information associated with a first fault;

evaluate the first NAR against a first model configured to:

compare the first set of node metrics of the first NAR to a pattern of node metrics corresponding to the first fault; and determine a node of the one or more nodes of the network predicted to experience the first fault based on whether a portion of the first set of node metrics corresponding to the node exhibit the pattern of node metrics corresponding to the first fault;

generate a ticket associated with the node predicted to experience the first fault;

store the ticket associated with the node predicted to experience the first fault at the memory;

generate ticket analytical records (TARs) based at least in part on ticket data, the ticket data including tickets associated with faults predicted by the first model, wherein each of the TARs includes a set of ticket metrics associated with the tickets;

evaluating, by the one or more processors, the TARs against a second model configured to:

identify self-healing tickets within tickets and non-self-healable tickets within the tickets; and determine, for each of the non-self-healable tickets, actions predicted to resolve faults corresponding to each of the non-self-healable tickets; and executing, by the one or more processors, at least one action predicted to resolve at least one of the faults corresponding to at least one the non-self-healable tickets.

18. The system of claim 17, wherein the one or more processors are configured to train the first model based on historic NARs and to train the second model based on historic TARs, the historic NARs and the historic TARs generated based on historic data.

19. The system of claim 17, wherein the one or more processors are configured to:

construct an action dictionary based at least in part on historical ticket data;

tag historical tickets included in the historical ticket data with one or more tags derived from the action dictionary; and train the second model based on the tagged historical ticket data.

20. The system of claim 17, wherein the second model is a multistage classification model that includes a first classifier and a second classifier, wherein the self-healing tickets are identified during a first stage of the multistage classification model and the non-self-healing tickets are identified during a second stage of the multistage classification model, wherein the first classifier is associated with the first stage and the second classifier is associated with the second stage, and wherein the second classifier is configured to determine the actions predicted to resolve the faults corresponding to each of the non-self-healable tickets.

* * * * *